(12) United States Patent
Bailor et al.

(10) Patent No.: US 7,941,399 B2
(45) Date of Patent: May 10, 2011

(54) COLLABORATIVE AUTHORING

(75) Inventors: Jonathan Beckett Bailor, Bellevue, WA (US); Ethan Joseph Bernstein, Mercer Island, WA (US); Mark Rolland Knight, Bellevue, WA (US); Christopher James Antos, Bellevue, WA (US); Andrew Richard Simonds, Newcastle, WA (US); Brian Michael Jones, Redmond, WA (US); Simon Peter Clarke, Seattle, WA (US); Edgar Mark Sunderland, Seattle, WA (US); David Benjamin Robins, Duvall, WA (US); Miko Arnab Sakhya Singha Bose, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 11/938,082

(22) Filed: Nov. 9, 2007

(65) Prior Publication Data

US 2009/0125518 A1    May 14, 2009

(51) Int. Cl.
*G06F 7/00* (2006.01)
*G06F 17/00* (2006.01)
(52) U.S. Cl. .......................... 707/608; 715/711
(58) Field of Classification Search .................. 715/711; 707/608
See application file for complete search history.

(56) References Cited

U.S. PATENT DOCUMENTS

| | | |
|---|---|---|
| 4,855,580 A | 8/1989 | Van Maanen, Jr. |
| 5,107,443 A * | 4/1992 | Smith et al. .................... 715/751 |
| 5,142,619 A | 8/1992 | Webster, III |
| 5,313,394 A * | 5/1994 | Clapp ............................ 715/209 |
| 5,339,389 A | 8/1994 | Bates |
| 5,486,686 A * | 1/1996 | Zdybel et al. ................. 235/375 |
| 5,630,138 A | 5/1997 | Raman |
| 5,664,186 A | 9/1997 | Bennett et al. |
| 5,671,428 A * | 9/1997 | Muranaga et al. ............ 715/751 |
| 5,692,178 A | 11/1997 | Shaughnessy |
| 5,751,958 A | 5/1998 | Zweben |
| 5,781,732 A | 7/1998 | Adams |
| 5,781,908 A | 7/1998 | Williams et al. |
| 5,787,262 A | 7/1998 | Shakib et al. |

(Continued)

FOREIGN PATENT DOCUMENTS

KR    10-0331685 B1    4/2002

(Continued)

OTHER PUBLICATIONS

Adler et al., "Evaluating and Implementing a Collaborative Office Document System," 2005, pp. 1-18, sce.carleton.ca/faculty/adler/publications/2005/adler-nash-noel-2005-Collab-Office.pdf.

(Continued)

*Primary Examiner* — Yicun Wu
*Assistant Examiner* — Pavan Mamillapalli
(74) *Attorney, Agent, or Firm* — Merchant Gould P.C.

(57) ABSTRACT

A collaborative authoring application provides an authoring environment in which two or more users can edit a document concurrently. Each user edits a copy of the document, sends updates to a master copy of the document, and receives updates from the master copy of the document. The authoring environment generally inhibits the users from providing conflicting editing instructions to the master copy of the document. For example, each user can generate a content lock about one or more data units within the document. The authoring environment may synchronize content locks automatically and content only at the request of the user.

17 Claims, 31 Drawing Sheets

U.S. PATENT DOCUMENTS

| | | | |
|---|---|---|---|
| 5,963,931 A * | 10/1999 | Fagg et al. | 706/50 |
| 6,000,945 A * | 12/1999 | Sanchez-Lazer et al. | 434/322 |
| 6,006,239 A | 12/1999 | Bhansali | |
| 6,055,546 A | 4/2000 | Pongracz et al. | |
| 6,065,026 A * | 5/2000 | Cornelia et al. | 715/202 |
| 6,067,551 A | 5/2000 | Brown et al. | |
| 6,073,161 A | 6/2000 | Deboskey | |
| 6,088,702 A * | 7/2000 | Plantz et al. | 707/999.103 |
| 6,202,085 B1 | 3/2001 | Benson et al. | |
| 6,209,128 B1 | 3/2001 | Gerard et al. | |
| 6,240,414 B1 | 5/2001 | Beizer | |
| 6,275,935 B1 | 8/2001 | Barlow | |
| 6,317,777 B1 | 11/2001 | Skarbo et al. | |
| 6,327,584 B1 | 12/2001 | Xian et al. | |
| 6,341,291 B1 | 1/2002 | Bentley et al. | |
| 6,342,906 B1 | 1/2002 | Kumar | |
| 6,363,352 B1 | 3/2002 | Dailey | |
| 6,411,965 B2 | 6/2002 | Klug | |
| 6,438,548 B1 | 8/2002 | Grim | |
| 6,446,093 B2 | 9/2002 | Tabuchi | |
| 6,529,905 B1 | 3/2003 | Bray et al. | |
| 6,560,614 B1 | 5/2003 | Barboy et al. | |
| 6,560,620 B1 | 5/2003 | Ching | |
| 6,662,209 B2 | 12/2003 | Potts | |
| 6,687,878 B1 | 2/2004 | Eintracht | |
| 6,711,718 B2 | 3/2004 | Pfeil | |
| 6,751,618 B1 | 6/2004 | Germscheid et al. | |
| 6,757,678 B2 | 6/2004 | Myllymaki | |
| 6,757,871 B1 | 6/2004 | Sato et al. | |
| 6,760,840 B1 | 7/2004 | Shimbo | |
| 6,772,165 B2 | 8/2004 | O'Carroll | |
| 6,854,087 B1 * | 2/2005 | Takeo et al. | 715/203 |
| 6,983,416 B1 | 1/2006 | Bae et al. | |
| 7,007,235 B1 * | 2/2006 | Hussein et al. | 715/751 |
| 7,039,679 B2 | 5/2006 | Mendez | |
| 7,058,663 B2 | 6/2006 | Johnston et al. | |
| 7,127,501 B1 | 10/2006 | Beir | |
| 7,149,776 B1 | 12/2006 | Roy et al. | |
| 7,185,277 B1 | 2/2007 | Bernstein et al. | |
| 7,200,668 B2 | 4/2007 | Mak | |
| 7,209,948 B2 | 4/2007 | Srinivasa | |
| 7,225,189 B1 | 5/2007 | McCormack | |
| 7,249,314 B2 * | 7/2007 | Walker et al. | 715/205 |
| 7,328,243 B2 | 2/2008 | Yeager | |
| 7,496,577 B2 * | 2/2009 | Williamson et al. | 707/999.009 |
| 7,577,906 B2 * | 8/2009 | Friedrichowitz et al. | 715/246 |
| 7,603,357 B1 | 10/2009 | Gourdol | |
| 7,647,292 B2 | 1/2010 | Hayashi | |
| 7,714,222 B2 * | 5/2010 | Taub et al. | 84/600 |
| 2001/0018697 A1 | 8/2001 | Kunitake et al. | |
| 2002/0007287 A1 | 1/2002 | Straube | |
| 2002/0065848 A1 * | 5/2002 | Walker et al. | 707/511 |
| 2003/0028600 A1 | 2/2003 | Parker | |
| 2003/0115481 A1 | 6/2003 | Baird | |
| 2003/0172113 A1 | 9/2003 | Cameron | |
| 2004/0068505 A1 | 4/2004 | Lee | |
| 2004/0107224 A1 * | 6/2004 | Bera | 707/203 |
| 2004/0122898 A1 | 6/2004 | Srinivasa | |
| 2004/0172395 A1 | 9/2004 | Edelstein | |
| 2004/0199550 A1 | 10/2004 | Ito et al. | |
| 2004/0205653 A1 | 10/2004 | Hadfield et al. | |
| 2004/0230903 A1 | 11/2004 | Elza et al. | |
| 2005/0097440 A1 * | 5/2005 | Lusk et al. | 715/500.1 |
| 2005/0210392 A1 | 9/2005 | Koide | |
| 2005/0234943 A1 | 10/2005 | Clarke | |
| 2005/0240858 A1 | 10/2005 | Croft et al. | |
| 2005/0289512 A1 | 12/2005 | Matsusaka | |
| 2006/0020360 A1 | 1/2006 | Wu | |
| 2006/0053194 A1 | 3/2006 | Schneider | |
| 2006/0053195 A1 * | 3/2006 | Schneider et al. | 709/204 |
| 2006/0080432 A1 | 4/2006 | Spataro | |
| 2006/0085402 A1 | 4/2006 | Brown et al. | |
| 2006/0101328 A1 | 5/2006 | Albornoz | |
| 2006/0123033 A1 | 6/2006 | Livshits | |
| 2006/0136511 A1 | 6/2006 | Ngo | |
| 2006/0200755 A1 | 9/2006 | Melmon et al. | |
| 2006/0218476 A1 | 9/2006 | Gombert | |
| 2006/0259524 A1 | 11/2006 | Horton | |
| 2007/0066293 A1 | 3/2007 | Peng | |
| 2007/0118598 A1 * | 5/2007 | Bedi et al. | 709/204 |
| 2007/0130334 A1 | 6/2007 | Carley | |
| 2007/0186157 A1 | 8/2007 | Walker | |
| 2007/0186171 A1 | 8/2007 | Junuzovic | |
| 2007/0198952 A1 | 8/2007 | Pittenger | |
| 2007/0203917 A1 | 8/2007 | Du et al. | |
| 2007/0226320 A1 | 9/2007 | Hager et al. | |
| 2007/0226604 A1 | 9/2007 | Chalasani | |
| 2007/0271502 A1 * | 11/2007 | Bedi et al. | 715/751 |
| 2008/0028300 A1 | 1/2008 | Krieger et al. | |
| 2008/0059539 A1 * | 3/2008 | Chin et al. | 707/203 |
| 2008/0072141 A1 | 3/2008 | Hodel-Widmer | |
| 2008/0098294 A1 | 4/2008 | Le | |
| 2008/0114740 A1 * | 5/2008 | Vergottini | 707/3 |
| 2008/0195800 A1 | 8/2008 | Lee | |
| 2008/0294895 A1 | 11/2008 | Bodner | |
| 2009/0006936 A1 * | 1/2009 | Parker et al. | 715/200 |
| 2009/0006948 A1 * | 1/2009 | Parker et al. | 715/255 |
| 2009/0063489 A1 | 3/2009 | Neumann | |

FOREIGN PATENT DOCUMENTS

| | | |
|---|---|---|
| WO | WO 01/33362 A1 | 5/2001 |
| WO | WO 02/33575 A2 | 4/2002 |
| WO | WO 2005/114467 | 12/2005 |
| WO | WO 2007/034858 A1 | 3/2007 |
| WO | WO 2007/062949 A1 | 6/2007 |

OTHER PUBLICATIONS

Citro et al., "Conflict Management for Real-Time Collaborative Editing in Mobile Replicated Architectures," School of Computer Science and Information Technology, RMIT University, Melbourne, Victoria, Australia, Australian Computer Society, Inc. © 2007, pp. 1-10, crpit.com/confpapers/CRPITV62Citro.pdf.

Green, Bob, "Converting Qedit to the Client/Server Model", robelle.com/library/papers/client-server/, 14 pages (Copyright 2004).

Haake et al., "Collaborative Authoring of Hypermedia Documents," Machine Translation Today, Translating and the Compute 15, pp. 41-58, Aslib:London 1993, pp. 1-18, pi6.fernuni-hagen.de/publ/MT-93.pdf.

Hebsgarrd, Poul J; Process Driven Document Management™, Version 6.1, Feb. 2007, pp. 1-13, brain-technology.com/upload/file__vk306c6tr779p9gntgho__16467.pdf.

Ignat et al., "Extending Real-Time Collaborative Editing Systems with Asynchronous Communication," Institute for Information Systems, ETH Zurich, (at least as early as Oct. 4, 2007) pp. 1-6, inf.ethz.ch/personal/ignat/Publications/cscwd__04.pdf.

La Fontaine, Robin, Monsell EDM Ltd., Merging XMLFiles: a new approach providing intelligent merge of XML data sets, Presented at XML Europe 2002, 21 pages, deltaxml.com/dxml/93/version/default/part/AttachmentData/data/merging-xml-files.pdf.

Microsoft Corporation, Compare and Merge Mechanisms, © 2007, 1 page, msdn2.microsoft.com/en-us/library/ek8hk7e2(VS.80,d=printer).aspx.

Preston et al., "Synchronous Editing via Web Services: Combining Heterogeneous Client and Server Technologies," Department of Computer Science, Georgia State University, Atlanta, Georgia, *CSCW 2006*, Nov. 4-8, 2006, Banff, Alberta, Canada, pp. 1-2. cims.clayton.edu/jpreston/PhD/Research/Preston%20-%20CSCW%20Demo%20Extended%20Abstract.pdf.

Synchronous Collaborative Text Document Editing Online: MoonEdit, reviewed Sep. 13, 2007, pp. 1-4, masternewmedia.org/news/2005/02/20/synchronous__collaborative__text__document__editing .htm.

Tichy, Walter F., RCS—A System for Version Control, Jan. 3, 1991, 20 pages, svlug.org/teams/rcs.pdf.

U.S. Appl. No. 11/951,973, filed Dec. 6, 2007, Confirmation No. 9364.

U.S. Appl. No. 11/957,010, filed Dec. 14, 2007, Confirmation No. 8535.

Wilde, Erik, "Multi-User Multimedia Editing with the MultimETH System," Swiss Federal Institute of Technology, CH 8092, Zurich, (at least as early as Oct. 10, 2007) pp. 1-9, dret.net/netdret/docs/wilde-tikrep18.pdf.

International Search Report and Written Opinion for PCT/US2008/081456, mailed Mar. 31, 2009, 12 pages.

"Codeville," codeville.org/, 2 pages (Date Retrieved Oct. 9, 2007).

"File Locks—GNU Emacs Lisp Reference Manual"; gnu.org/software/emacs/elisp/html_node/File-Locks.html; Mar. 28, 2006; 2 pages.

"Status of Software Reuse 577," plex86.org/Computer_Folklore/Status-of-Software-Reuse-577.html, 2 pages (Date Retrieved Oct. 9, 2007).

Galli, R., "Journal File Systems in Linux," bulma.net/impresion.phtml?nIdNoticia=1154, 15 pages (Jan. 24, 2002).

Miller et al.; "Interactive Simultaneous Editing of Multiple Text Regions"; co-ode.org/resources/papers/k-cap2007-seidenberg.pdf; Jun. 2001; 15 pages.

Seidenberg et al; "A Methodology for Asynchronous MultiUser Editing of Semantic Web Ontologies"; xmpp.org/extensions/xep-0058.html; Mar. 28, 2006; 8 pages.

Shchepin; "XEP-0058: Multi-User Text Editing"; groups.csail.mit.edu/uid/projects/simuledit/usenix01.pdf; Oct. 9, 2007; 5 pages.

U.S. Appl. No. 12/044,744, filed Mar. 7, 2008, Confirmation No. 7862.

U.S. Appl. No. 12/111,174, filed Apr. 28, 2008, Confirmation No. 6839.

U.S. Appl. No. 12/117,025, filed May 8, 2008, Confirmation No. 8234.

U.S. Appl. No. 12/117,040, filed May 8, 2008, Confirmation No. 8262.

Google, "Share and Collaborate in Real Time," 2008, 1 page, google.com/google-d-s/intl/en/tour2.html.

McKechan et al., "Design Considerations for Creditor: A Collaborative Report Writing Editor," 10 pages, accessed May 16, 2008, userpages.umbc.edu/~jcampbel/Group01/McKechan_paper_iwces3.pdf.

U.S. Appl. No. 12/145,536, filed Jun. 25, 2008, Bailor et al., Confirmation No. 3462, 20 pages.

"Google, Google Docs & Spreadsheets Tour" downloaded from google.com/google-d-s/intl/en/tour2.html on Nov. 9, 2007 (1 page).

Michael Koch, "Design Issues and Model for a Distributed Multi-User Editor" (pp. 1-21), from *Computer Supported Cooperative Work, An International Journal*, 3(3-4), 19995, pp. 359-378.

Pacull et al., "Duplex: A Distributed Collaborative Editing Environment in Large Scale" *Proceedings of the Conference on Computer Supported Cooperative Work*, Oct. 22-26, 1994, Chapel Hill, NC, USA. ACM, 1994; pp. 165-173.

Adkins et al.; GSS Collaboration in Document Development: Using Group Writer to Improve the Process, Proceedings of the 32nd Hawaii International Conference on System Sciences, Copyright © 1999 IEEE, 11 pages.

International Search Report and Written Opinion for PCT/US2009/039316, mailed Jan. 18, 2010, 11 pages.

International Search Report and Written Opinion for PCT/US2008/083862 / MS 321998.02 mailed Mar. 31, 2009, 11 pages.

Synchronous Collaborative Text Document Editing Online: MoonEdit, reviewed Sep. 13, 2007, pp. 104, http://www.masternewmedia.org/news/2005/02/20/synchronous_collaborative_text_document-editing.htm.

US Office Action (Non-Final) for U.S. Appl. No. 11/957,010, mailed Mar. 18, 2010.

US Final Office Action for U.S. Appl. No. 11/957,010, mailed Aug. 18, 2010.

US Non-Final Office Action for U.S. Appl. No. 12/044,744, mailed Jul. 26, 2010.

International Preliminary Report and Written Opinion for PCT/US/2008/083069 / MS 321999.02 mailed May 29, 2010, 6 pages.

US Final Office Action for U.S. Appl. No. 12/044,744, mailed Nov. 22, 2010, 16 pages.

US Non-Final Office Action for U.S. Appl. No. 12/117,025, mailed Sep. 21, 2010.

"Google, Google Docs & Spreadsheets Tour" downloaded from http://www.google.com/google-d-s/intl/en/tour2.html on Nov. 9, 2007 (1 page).

Michael Koch, "Design Issues and Model for a Distributed Multi-User Editor" (pp. 1-21), from *Computer Supported Cooperative Work, An International Journal*, 3(3-4),1995 pp. 359-378.

\* cited by examiner

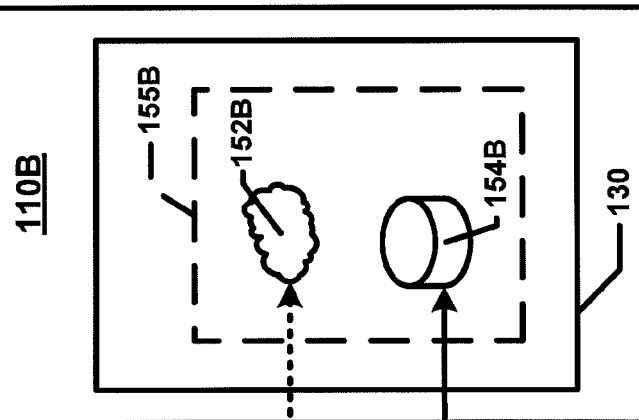
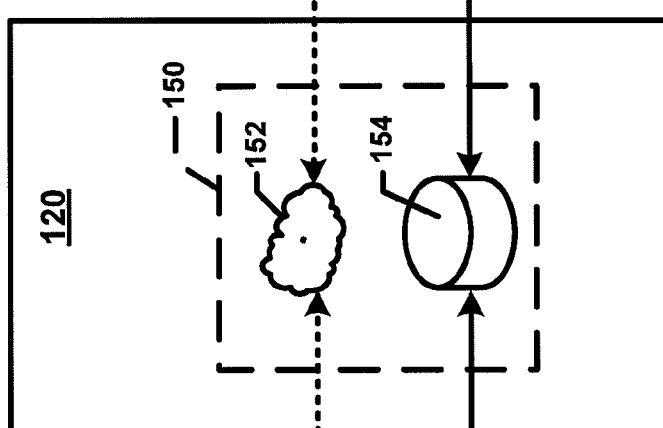
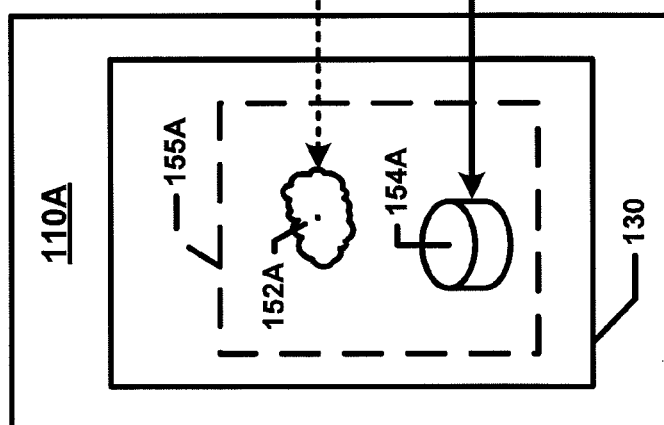
FIG. 2

(T3)

COLLABORATIVE AUTHORING

BACKGROUND

Traditional collaborative editing tends to be performed serially. Users take turns accessing a document, editing the document, and storing their edits. The accessing user may place a lock on the file to inhibit other users from editing the document when the accessing user is editing the document. The iterative editing process can cause delays since each user may wait for a turn at editing the document. In addition, the iterative editing process may be difficult to manage. For example, each user may need to keep track of who is editing which portions of the document, which version of the document is the most recent, and when the user will have a turn.

In other types of traditional collaborative editing, each user can edit a different copy of a document. Subsequently, all of the edited copies may be merged into a single document. This large scale merge also may cause delays, lead to numerous editing conflicts, and/or be difficult to manage. For example, the user responsible for merging the documents may be required to track the relationship between the documents. The user also may be responsible for resolving conflicts among two or more of the edited copies.

It is with respect to these and other considerations that the present disclosure has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

A collaborative authoring application provides an authoring environment in which two or more users can edit a document concurrently. Each user edits a copy of the document, periodically sends updates to a master copy of the document, and periodically receives updates from the master copy of the document. The authoring environment generally inhibits the users from providing conflicting editing instructions to the master copy of the document. In other embodiments, the authoring environment can inhibit editing conflicts if the users edit the document at different times.

According to aspects of the disclosure, each document being authored can be divided into one or more data units. Each user can generate a content lock about one or more of the data units. Generating a content lock about a data unit inhibits other users from editing the locked data unit. In one embodiment, content locks can grow and/or shrink automatically as the user edits the document.

According to other aspects of the disclosure, the authoring environment synchronizes both content and metadata among the user copies and the master copy of the document. In general, the authoring environment synchronizes metadata automatically and synchronizes content only at the request of one of the users. In one embodiment, the metadata includes content locks.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 2 is a schematic block diagram illustrating the authoring system of FIG. 1 in which a document stored on first computing device can include content and metadata in accordance with the principles of the present disclosure;

DETAILED DESCRIPTION

In the following detailed description, references are made to the accompanying drawings that form a part hereof, and in which are shown by way of illustrations specific embodiments or examples. While the disclosure will be described in the general context of program modules that execute in conjunction with an application program that runs on an operating system on a computer system, those skilled in the art will recognize that the disclosure also may be implemented in combination with other program modules. The embodiments described herein may be combined and other embodiments may be utilized without departing from the spirit or scope of the present disclosure. The following detailed description is therefore not to be taken in a limiting sense, and the scope of the invention is defined by the appended claims and their equivalents.

Figure 1:
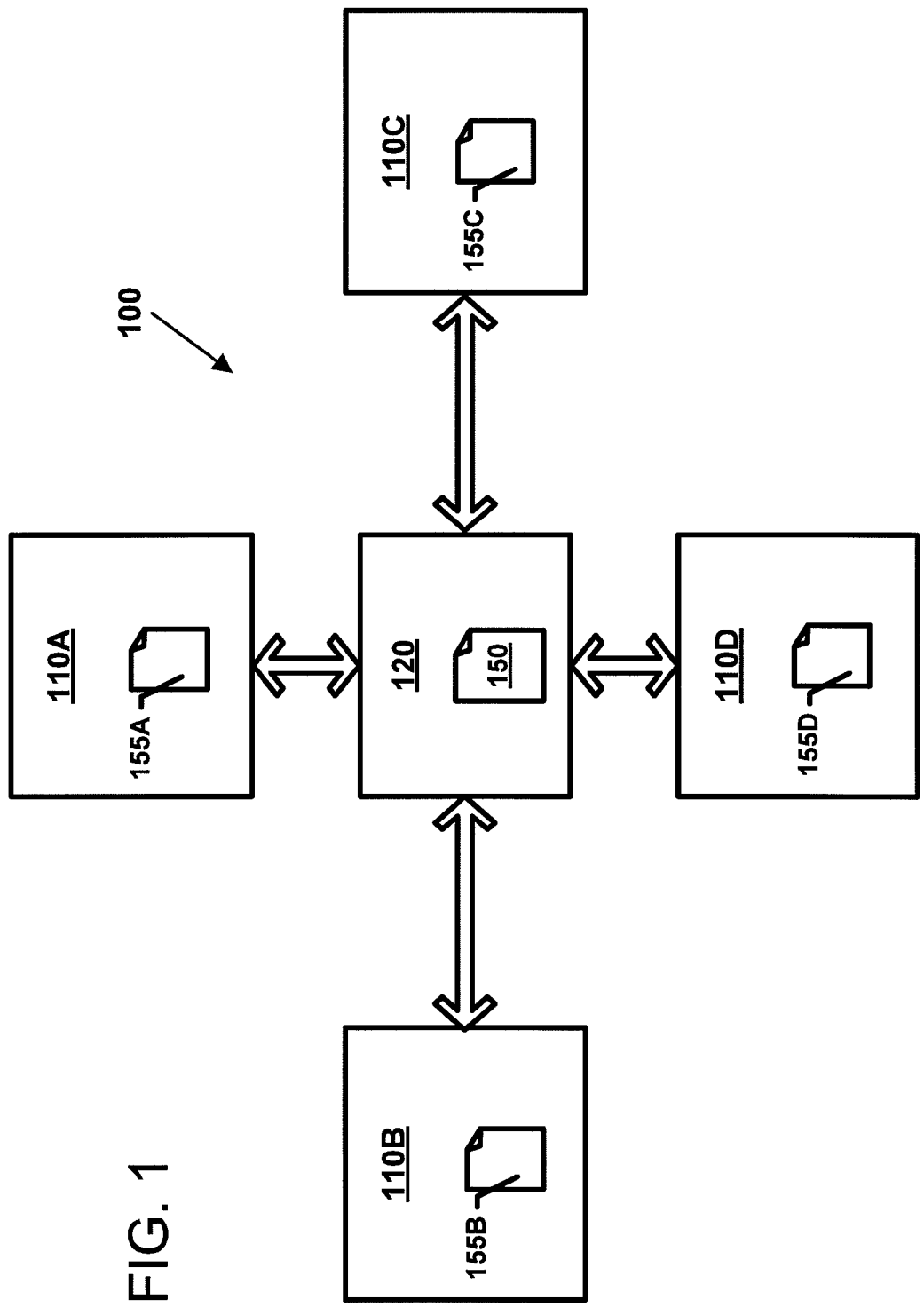
FIG. 1 is a schematic block diagram illustrating an example authoring system having features that are examples of inventive aspects of the disclosure.

Embodiments of the present disclosure provide an environment in which multiple users can collaboratively author a document. FIG. 1 illustrates an example authoring system 100 having features that are examples of inventive aspects of the disclosure. The authoring system 100 includes a storage device 120 storing a master copy of a document 150. In one embodiment, the storage device 120 can include a computing device. In another embodiment, the storage device 120 can include one or more storage devices (e.g., a network of computing devices).

The authoring system 100 also includes at least one user computing device 110 that is communicatively coupled to the storage device 120. Each of the user computing devices 110 can edit the document 150 by creating a user copy 155 of the document 150 and editing the user copy 155. The user copies 155 of the document 150 are synchronized when the user computing devices 110 periodically send to the storage device 120 updates to be shared with the other user computing devices and periodically obtain from the storage device 120 updates from other user computing devices.

As the term is used herein, a user computing device 110 includes any computing device that obtains a user copy of a document to be authored from a master copy of the document. The user computing device 110 can be different from the storage device 120 or can include a different user account implemented on the storage device 120. In one embodiment, a computing device that acts as a storage device 120 for one document may act as a user computing device 110 for a different document and vice versa.

In the example shown, four user computing devices 110A, 110B, 110C, and 10D are communicatively coupled to the storage device 120. In other embodiments, however, any number of computing devices 110 may be coupled to the storage device 120. In the example shown, each user computing device 110A, 110B, 110C, 110D can send to the storage device 120 updates generated by the user of the user computing device and can request from the storage device 120 updates generated by the users of the other user computing devices. In one embodiment, the storage device 120 can be a server computing device and the user computing devices 110A, 110B, 110C, 110D can be client computing devices.

As shown in FIG. 2, the document 150 stored on the storage device 120 can include content 152 and metadata 154. Authoring applications 130 on the user computing devices 110 process and manipulate the content and metadata of the user copies 155 of the document 150. In some embodiments, metadata 154 can be stored separately from content 152. For example, content 152 can be stored in the document 150 and metadata 154 can be stored in a table (see FIG. 7) separate from the document 150. In other embodiments, however, the metadata 154 can be stored within the document 150.

In general, the user computing devices 110 can synchronize updates to the content 152 separately from updates to the metadata 154. In general, metadata updates 154 are automatically synchronized among the storage device 120 and user computing devices 110, whereas content updates 152 from each user computing device 110 are synchronized at the request of the respective user.

Figure 3:
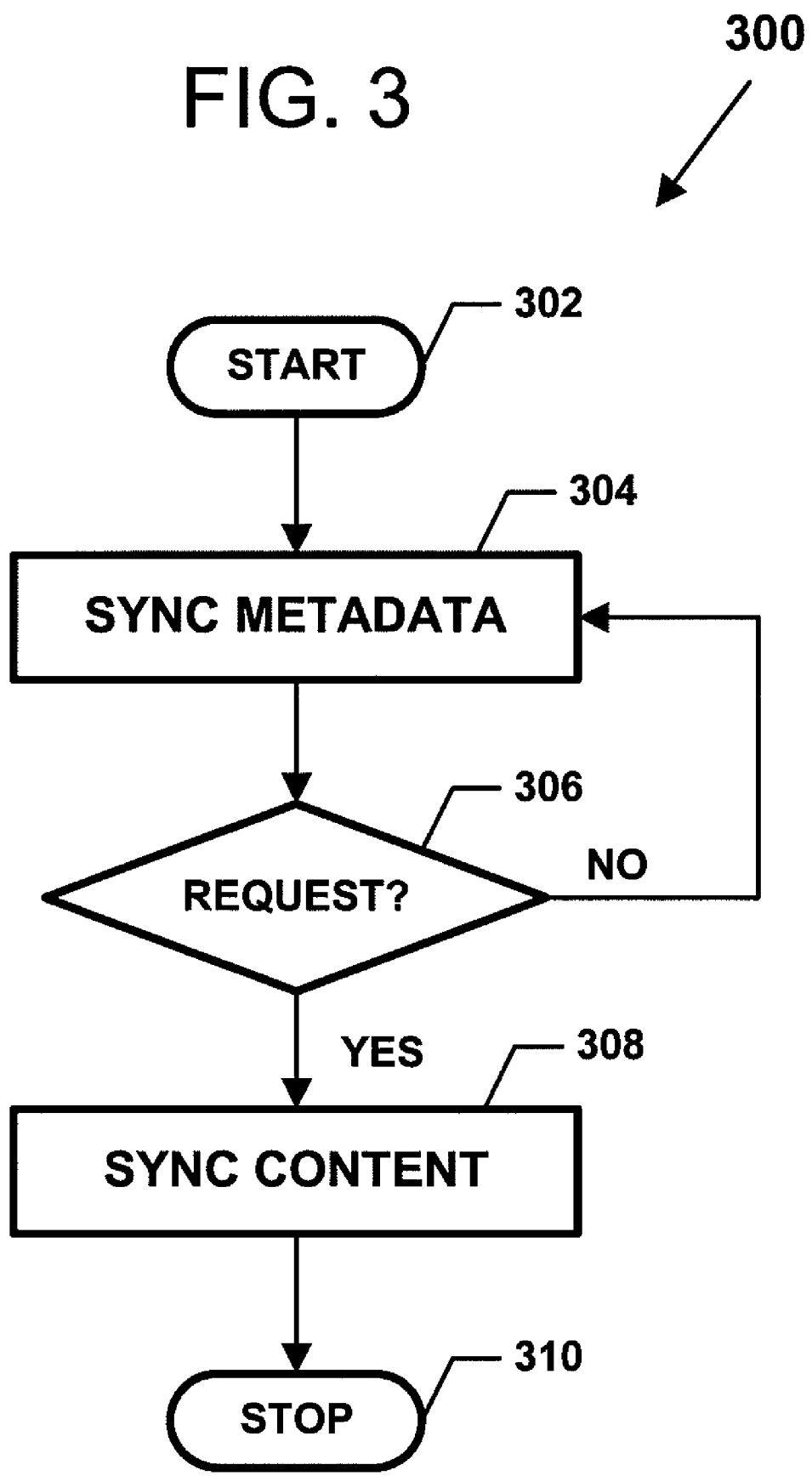
FIG. 3 is a flowchart illustrating an exemplary synchronization process by which an authoring system can synchronize a copy of a document stored on a user computing device with the master copy of the document in accordance with the principles of the present disclosure.

FIG. 3 is a flowchart illustrating an exemplary synchronization process 300 by which an authoring system 100 can synchronize a copy 155 of a document stored on a user computing device 110 with the master copy 150 of the document stored on the storage device 120. The synchronization process 300 initializes and begins at a start module 302 and proceeds to a first update operation 304.

The first update operation 304 synchronizes the metadata of the copy 155 with the metadata of the document 150 without requiring any interaction with the user. For example, the first update operation 304 can provide an exchange of metadata between the storage device 120 and the user computing device 110 at periodic time intervals. In one embodiment, the first update operation 304 provides for an exchange of metadata every few seconds. In other embodiments, however, the first update operation 304 can provide for the exchange of metadata to occur in shorter or longer time intervals.

A request module 306 determines whether a request to synchronize content has been received. For example, the request module 306 can determine whether a user of one of the user computing devices 110 has requested to share content changes with other users. In another embodiment, the request module 306 can determine whether a user of one of the user computing devices 110 has requested to view content changes made by other users.

If the request module 306 determines that no request to synchronize content has been made, then the synchronization process 300 cycles back to the first update operation 304 and begins again. If the request module 306, however, determines that a request to synchronize content has been received, then the synchronization process 300 proceeds to a second update operation 308, which provides an exchange of content between the storage device 120 and the user computing device 110. The synchronization process 300 completes and ends at a stop module 310.

As the term is used herein, content updates 152 refer to any addition, deletion, and/or revision made to the substantive content of a document. For example, content updates for a word processing document can include added paragraphs (i.e., or sections thereof), deleted paragraphs (i.e., or section thereof), and/or revised paragraphs (i.e., or sections thereof). In another embodiment, content updates for a presentation document can include added, deleted, and/or revised pictures, text, animations, sounds, and other such data objects.

As the term is used herein, metadata updates 154 refer to any addition, deletion, and/or revision made to metadata of the document. Non-limiting examples of document metadata include content locks, presence information, and other such data. As will be discussed herein, content locks inhibit editing of content within the lock by users that do not own the lock. Presence information indicates which users have indicated an intention to edit the document as will be discussed in greater detail herein.

Referring to FIGS. 4-9, content locks inhibit editing conflicts by indicating which portions of a document have been claimed by another user. In some embodiments, the content locks can prevent (i.e., bar) a user from editing a portion of a document that has been claimed by another user. In other embodiments, however, the user can choose to break the content lock and edit the portion of the document. In such cases, the lock can warn the user that conflicts may arise when editing the locked section.

Figure 4:
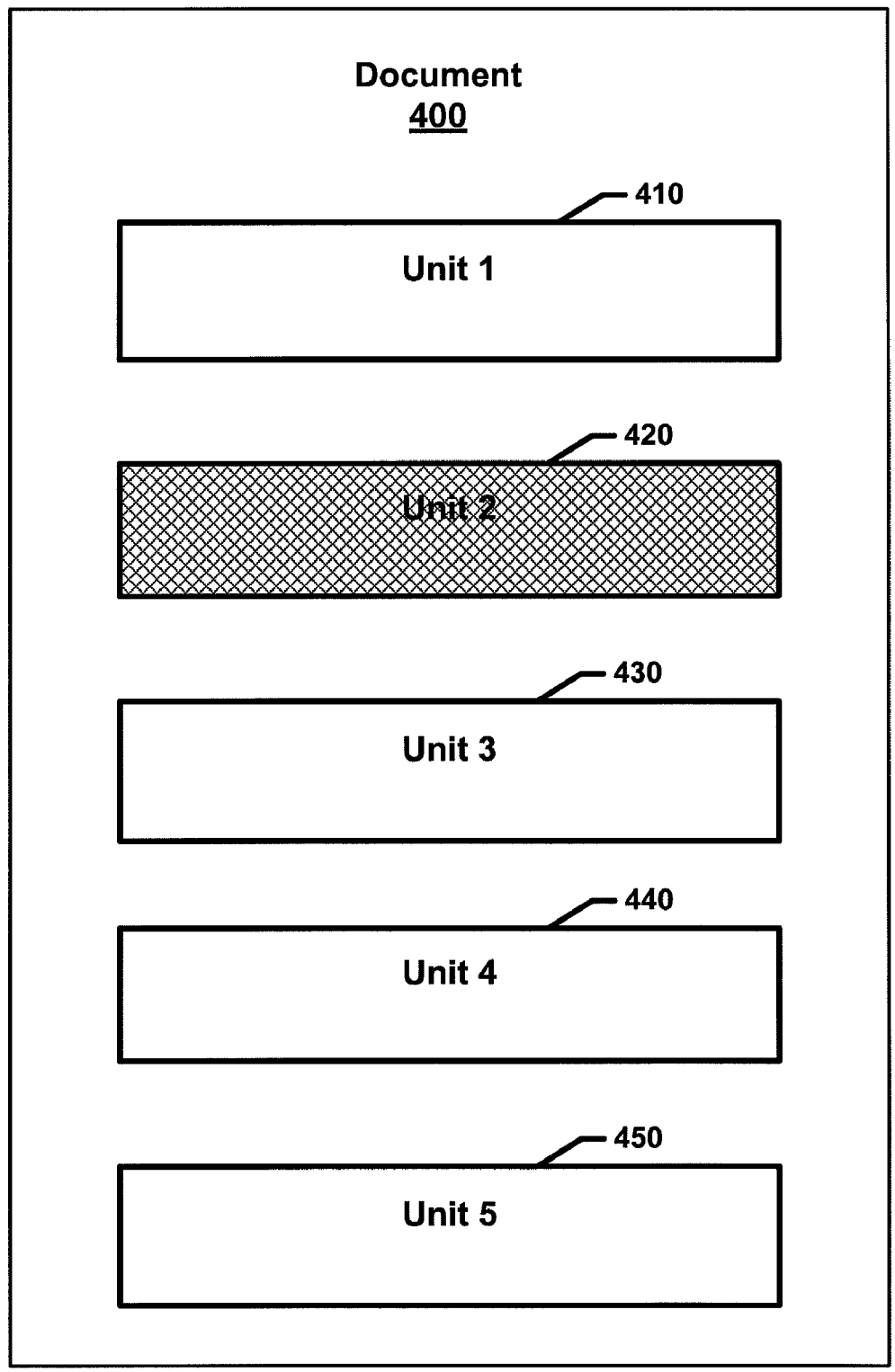
FIG. 4 is a schematic block diagram of a document having five units of data, the second of which is locked, in accordance with the principles of the present disclosure.

For example, FIG. 4 is a schematic block diagram of a document 400 having five units of data 410, 420, 430, 440, 450. In one embodiment, the document 400 is a word processing document and the units of data 410-450 are paragraphs of text. In another embodiment, the document 400 is a presentation document and the first unit of data 410 is a title or subject heading, the second unit of data 420 is a picture or other data object, and the remaining units of data 430, 440, 450 are blocks of text.

A first user can generate a lock about one or more of the units of data 410-450 of the document 400. In the example shown in FIG. 4, the second unit of data 420 has been locked by the first user, as indicated by the cross-hatching. By generating the content lock, the first user has indicated the first user intends to edit the unit of data 420. For example, the user can generate the lock when the user is actively editing the unit of data 420. In another embodiment, the user can generate the lock and then edit the unit of data 420 at a later time. As noted above, the authoring application managing the document 400 may prevent a user other than the first user from editing the locked data unit 420.

In general, a content lock generated by a first user is displayed to all other users who access the document during the life of the lock. In one embodiment, the first user also can view the content lock. Locks can be displayed using different types of indicia. For example, in one embodiment, the background of a locked unit of data may be colored, shaded, or patterned (e.g., see data unit 420 of FIG. 4). In another embodiment, the content (e.g., text, picture, shape, or other data object) of the locked unit may be colored, shaded, or patterned. In yet another embodiment, a box, bracket, or symbol can be displayed adjacent the locked unit of data to indicate the lock.

A content lock may be generated around one or more units of data within a document. In some embodiments, the content lock can be generated implicitly without express instruction from the user. For example, an authoring application may generate a content lock about a data unit when a user positions a cursor within, highlights, or otherwise selects the data unit. In another embodiment, an authoring application may generate a content lock about a data unit when the user begins editing the data unit. In another embodiment, an authoring application may generate a content lock about a data unit when a user saves edits made to the data unit. In some embodiments, the authoring application may generate content locks around multiple, inter-dependent data units within the document even if only one of the data units is claimed by a user. In other embodiments, a user may explicitly define a content lock about one or more data units.

Figure 5:
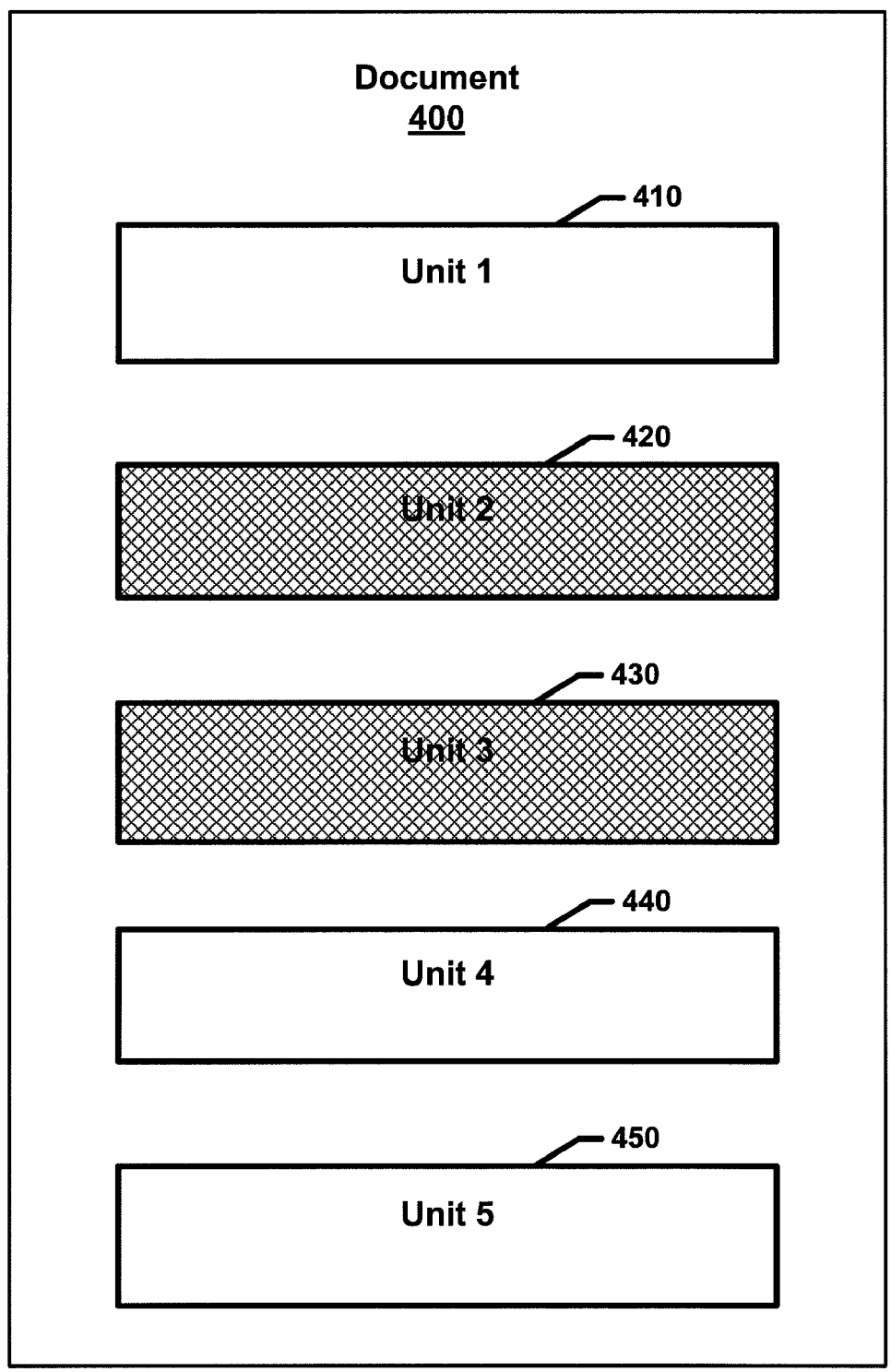
FIG. 5 is a schematic block diagram of the document of FIG. 4 in which a content lock has been added to the third data unit in accordance with the principles of the present disclosure.
Figure 6:
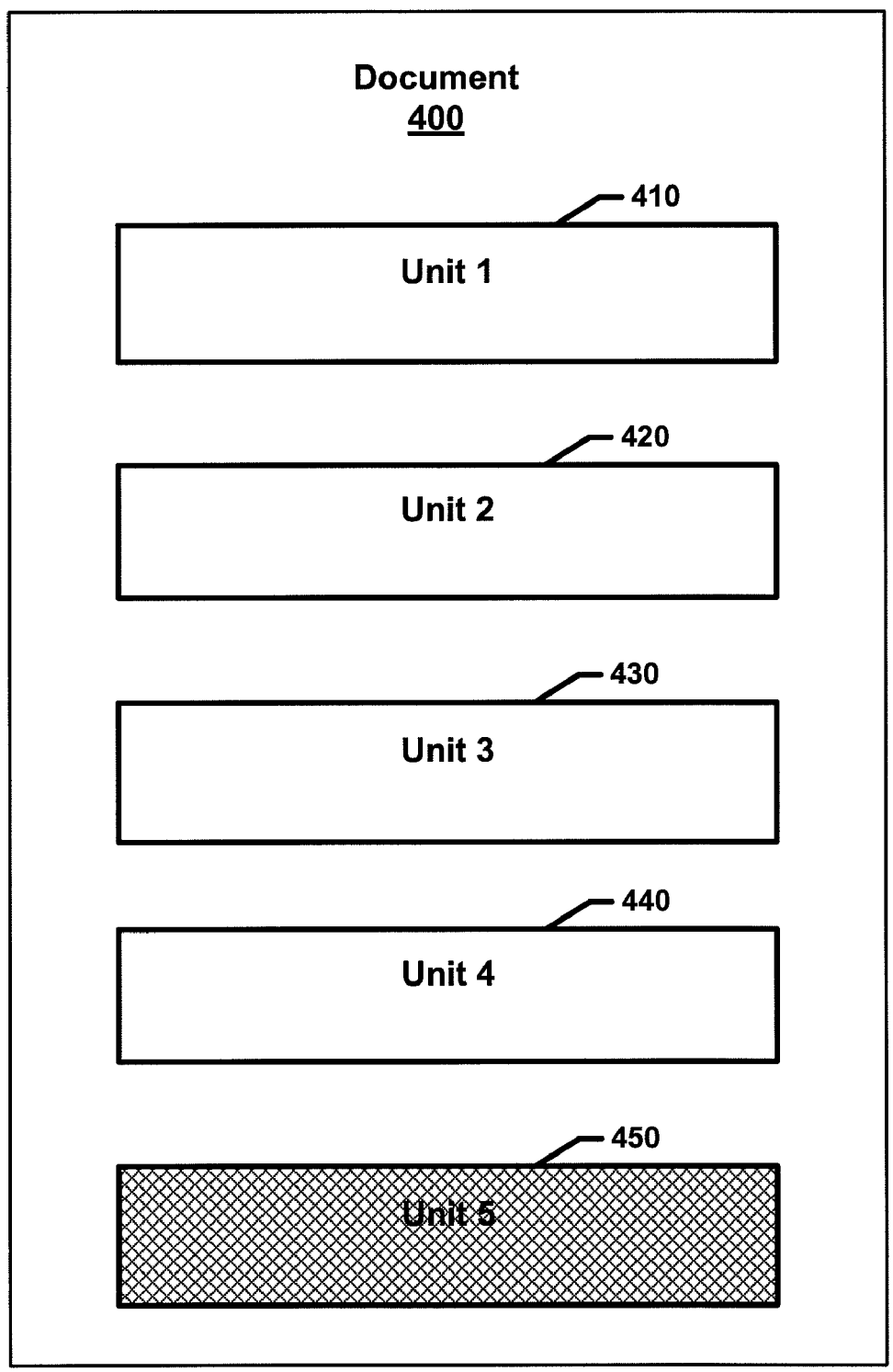
FIG. 6 is a schematic block diagram of the document of FIG. 4 in which the content locks on the second and third data units have been released and a new content lock has been added to the fifth data unit in accordance with the principles of the present disclosure.

In some embodiments, a content lock can grow to include additional units of data within the document and/or shrink to release one or more units of data within the document. In one embodiment, the content lock can grow to include only contiguous units of data. For example, as shown in FIG. 5, the content lock (e.g., see cross-hatching) around the second data unit 420 can expand to include the third data unit 430 if the user selects or edits the third data unit 430. A content lock or portion thereof generally can be released at the discretion of the user who generated the content lock. In some embodiments, the user who generated the content lock releases the content lock by selecting or editing another data unit.

In one embodiment, the user must indicate the user has finished editing the data unit before the authoring application will release the lock. For example, the authoring application may release the lock only after the user has provided instructions to store the document. In another embodiment, the authoring application may release a lock after the user selects or begins editing a remote data unit, such as the fifth data unit 450 of FIG. 6. In another embodiment, the authoring application only releases a lock after both movement to a non-contiguous data unit and a finalization act (e.g., instructions to store the document). In other embodiments, a content lock can be released explicitly by an administrator or another user.

Figure 7:
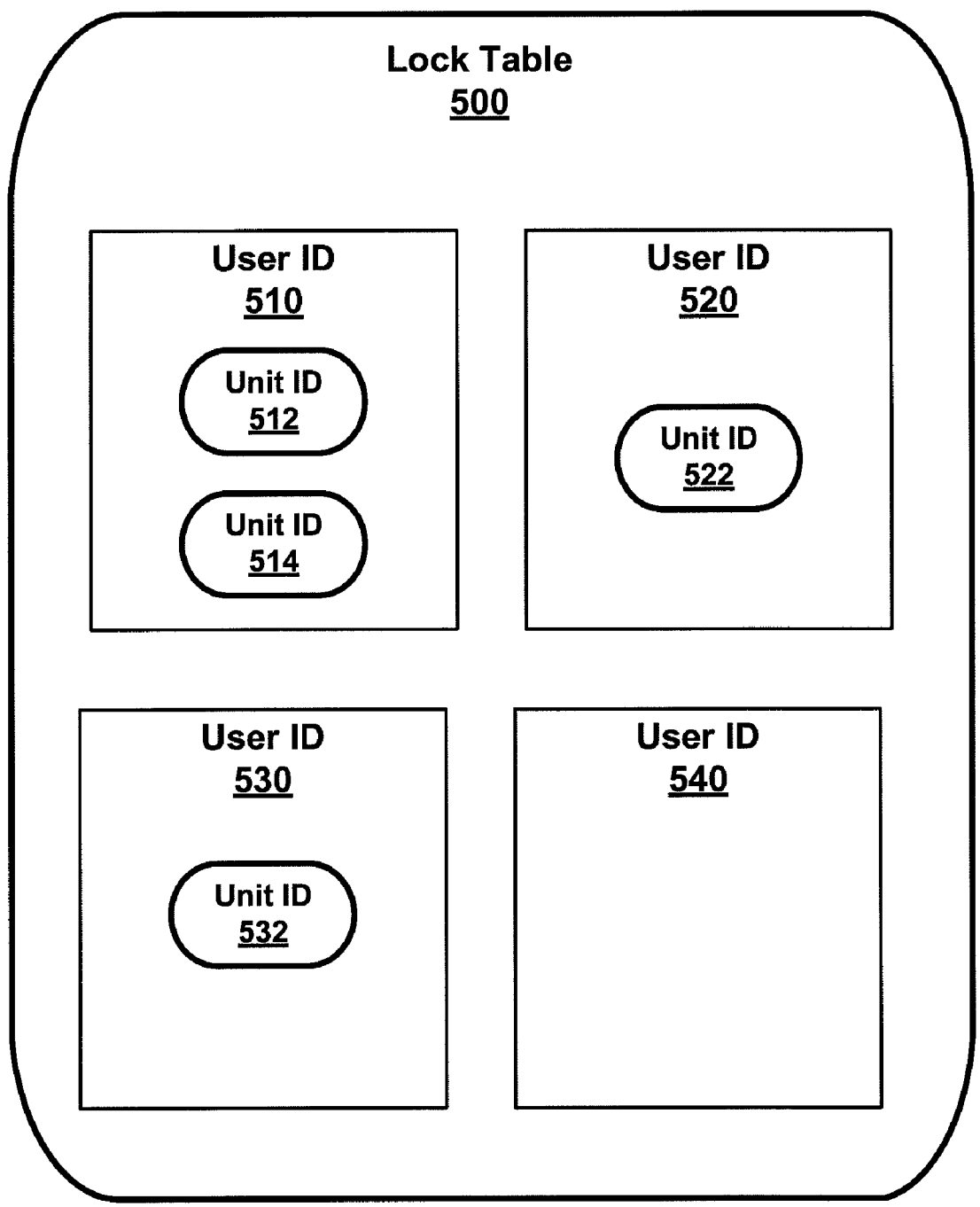
FIG. 7 is a schematic block diagram of a lock table in accordance with the principles of the present disclosure.

Referring to FIG. 7, lock metadata can be stored in a variety of different formats. For example, the lock metadata of FIG. 7 is stored in a table format 500. The lock table 500 of FIG. 7 includes a list of users, each of whom is identified with a user identifier (e.g., an identification number) that is uniquely assigned to the user. Data units to be locked are identified with unit identifiers (e.g., identification numbers) that are uniquely assigned to each data unit within a document. The lock table 500 associates the unit identifiers of the one or more data units to be locked with the user identifiers of the users who own the locks.

For example, in the lock table 500, data units 512 and 514 are associated with a first user 510. Other users, therefore, are inhibited from editing data units 512 and 514. Data unit 522 is associated with user 520. Other users, including the first user 510, therefore, are inhibited from editing data unit 522. The fourth user 540 has not locked any portion of the document and so is not associated with any unit identifiers. In other embodiments, however, lock metadata can be stored in a different format or within the document. For example, the lock table 500 can be arranged by unit identifier instead of by user identifier.

Presence metadata also can be stored in a variety of formats. For example, presence metadata can be stored in the lock table 500 of FIG. 7. In another embodiment, however, presence metadata can be stored in a separate table or in a different format. Presence metadata includes the user identifier of each user that is currently accessing the document or that has staked a claim (e.g., generated a content lock) on a data unit of the document. For example, a metadata table, such as the lock table 500, can store the user identifier of each user having a claim to at least one data unit of the document. Like lock metadata, presence metadata can be synchronized automatically.

Figure 8:
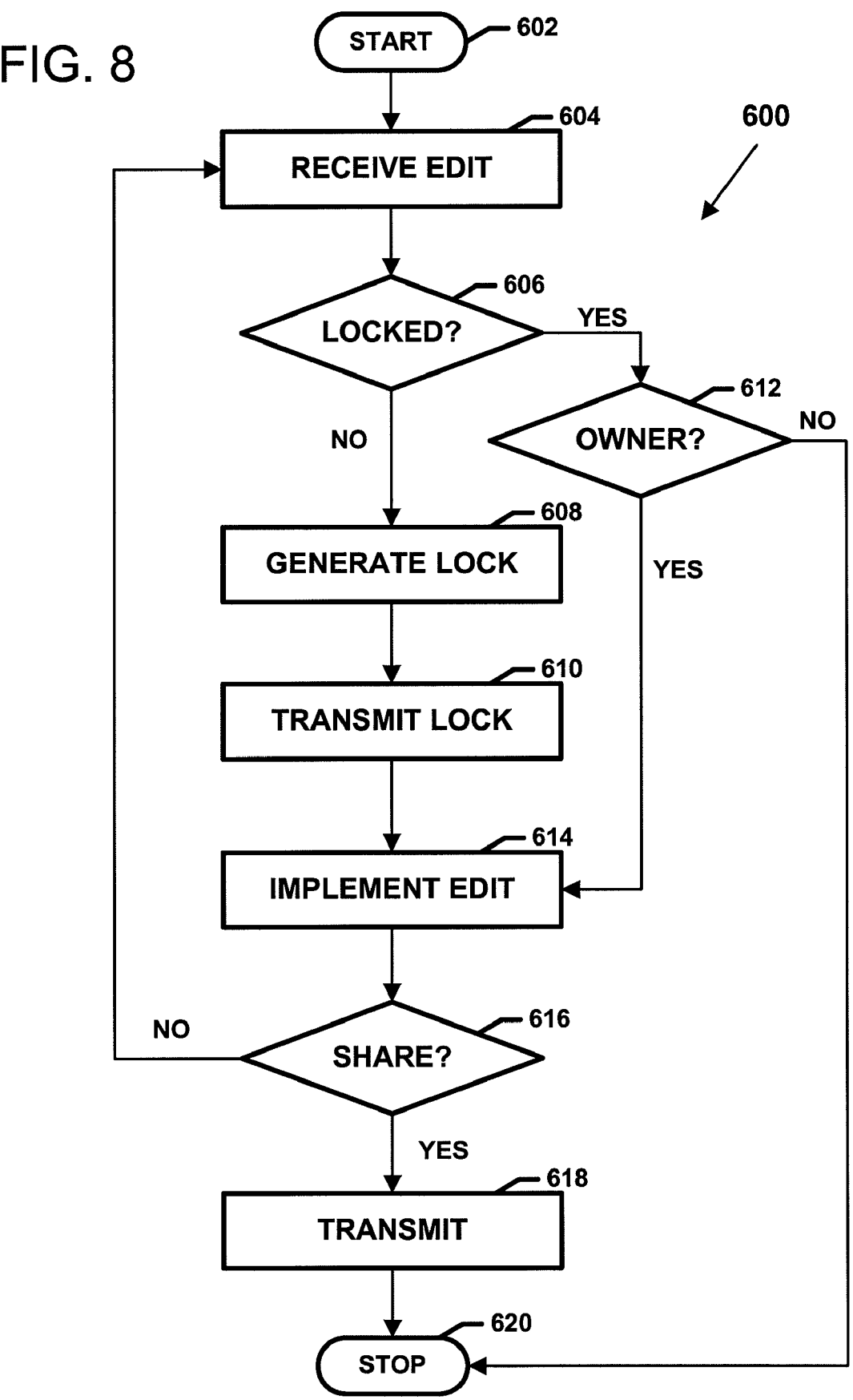
FIG. 8 is a flowchart illustrating an example synchronization processes implemented by an authoring application to share updates made by a user of the authoring application with other users in accordance with the principles of the present disclosure.
Figure 9:
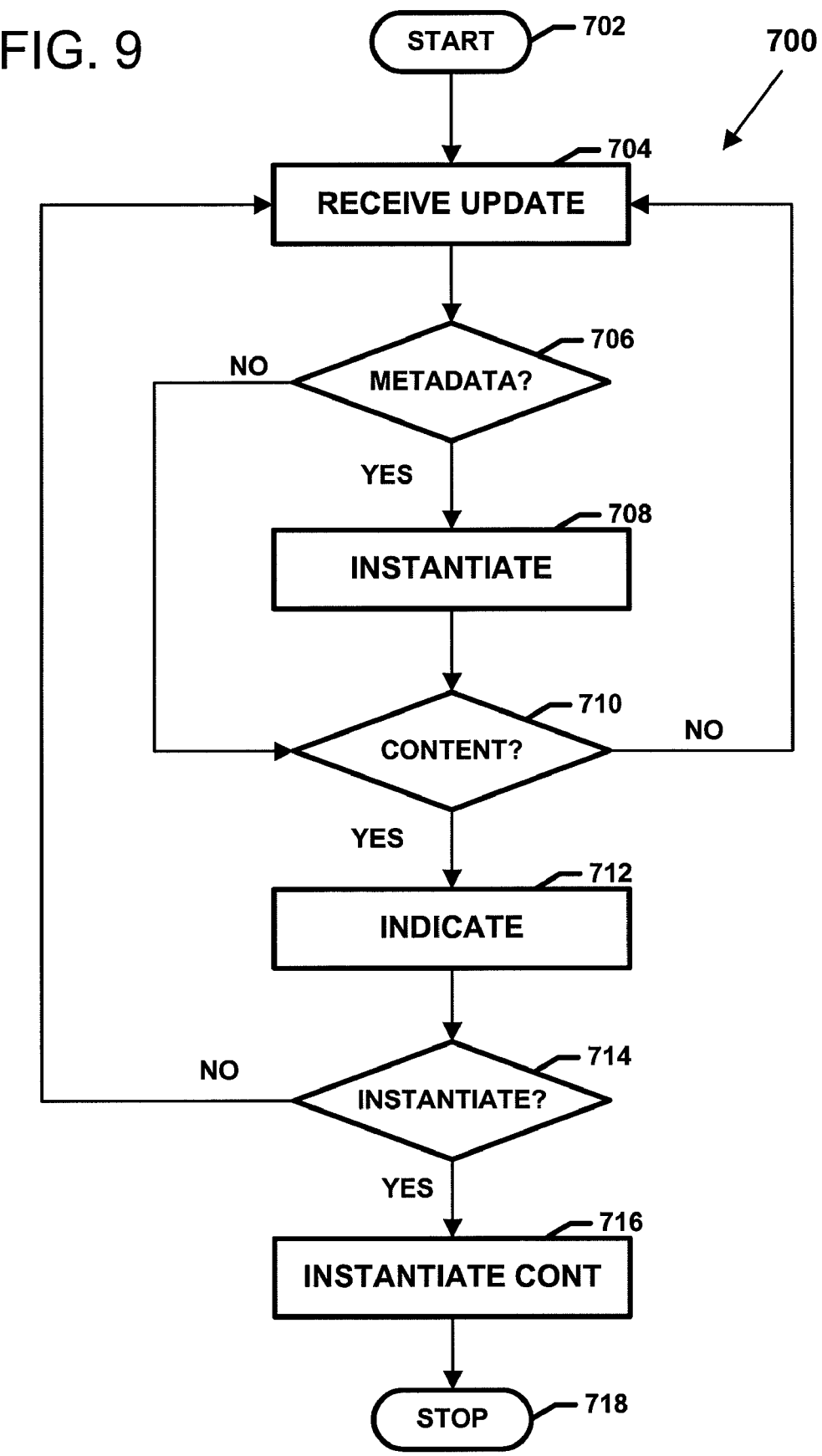
FIG. 9 is a flowchart illustrating another example synchronization process implemented by an authoring application to instantiate updates made by other users into the document being edited with the authoring application in accordance with the principles of the present disclosure.

FIGS. 8 and 9 are flowcharts illustrating example synchronization processes 600, 700 by which content and locks can be synchronized among multiple computing devices. The first synchronization process 600 is implemented by an authoring application to share with other users updates made by a first user with the authoring application. The second synchronization process 700 is implemented by an authoring application to instantiate updates made by other users into the document being edited with the authoring application.

The first synchronization process 600 of FIG. 8 initializes and begins at a start module 602 and proceeds to a receive operation 604. The receive operation 604 receives an instruction from the first user to perform an editing operation on one or more data units within a document. Non-limiting examples of editing operations include adding, editing, and/or deleting data units (e.g., text, drawings, pictures, shapes, headings, etc.) or portions thereof, adding and/or deleting formatting of the data units, rearranging a sequence of the data units, and other such operations.

A first determination module 606 checks if the data unit on which the editing operation is to be performed is locked. For example, the first determination module 606 can access a lock table, such as the lock table 500 of FIG. 7, to determine whether a unit identifier assigned to the data unit is associated with any user. In another embodiment, the first determination module 606 can otherwise determine whether the data unit is locked.

If the first determination module 606 determines the data unit is not locked, then a generate operation 608 creates a content lock on the data unit. For example, in one embodiment, the generate operation 608 can add an entry to the lock table 500 of FIG. 7 associating the unit identifier of the data unit with the user identifier of the first user. A transmit operation 610 sends lock metadata indicating the existence of the newly generated lock to the device storing the master copy of the document. For example, the transmit operation 610 can send the lock metadata from a user computing device, such as computing device 110A of FIG. 1, to a storage device, such as storage device 120. In one embodiment, the lock metadata includes instructions that describe incremental edits (e.g., delta states) to the lock metadata. An implement operation 614 performs the editing operation on the data unit.

Alternatively, if the first determination module 606 determines the data unit is locked, then a second determination module 612 obtains ownership information for the lock. In one embodiment, if the second determination module 612 determines the lock is owned by another user, then the synchronization process 600 completes and ends at a stop module 620 without performing the editing operation. In another embodiment (not shown), the synchronization process 600 may enable the first user to choose to break the lock and then proceed to generate operation 608. However, if the second determination module 612 determines the lock is owned by the first user, then the synchronization process 600 proceeds to the implement operation 614 discussed above. In another embodiment (not shown), the synchronization process 600 can determine whether the lock on any data units should be released.

A third determination operation 616 determines whether the first user has provided an instruction (either explicitly or implicitly) to share content changes to the data unit resulting from implementing the editing operation. For example, the third determination operation 616 may determine whether the first user has provided an instruction to store the document. In another embodiment, the third determination operation 616 may determine whether the first user has selected a "share changes" button or other such indicia. In another embodiment, the third determination operation 616 may determine an auto-save feature has been implemented by the application. If the third determination operation 616 determines instructions to share have not been provided, then the synchronization process 600 cycles back to the receive operation 604 and begins again.

If the determination operation 616 determines instructions to share have been provided, however, then the synchronization process 600 proceeds to a transmit operation 618, which sends content updates to the device storing the master copy of the document. Content updates indicate changes made to the content of the document by the editing operation. For example, the transmit operation 618 can send the content updates from a user computing device 110A of FIG. 1 to a storage device 120. In one embodiment, content updates include a newly generated version of the document. In another embodiment, content updates indicate incremental edits (e.g., delta states) to the content between the current user copy of the document and the master copy of the document. The synchronization process 600 completes and ends at the stop module 620 as discussed above.

The second synchronization process 700 of FIG. 9 initializes and begins at a start module 702 and proceeds to a receive operation 704. The receive operation 704 receives an update based on changes made to the document by other users. The update can include changes to the content and/or metadata of the document. In one embodiment, the receive operation 704 can poll the device storing the master copy of the document and request updates. In another embodiment, the device storing the master copy can push changes to the authoring application.

A first determination module 706 determines whether the update includes any changes to the metadata of the document. For example, the first determination module 706 can determine whether any other user has established a new lock or released a lock on a data unit. In another embodiment, the first determination module 706 can determine whether another user has accessed the document.

If the first determination module 706 determines a metadata update has been received, then an implement operation 708 automatically instantiates the received metadata updates. For example, the implement operation 708 can cause the authoring application to update a lock table, such as lock table 500 of FIG. 7, based on the metadata update. However, if the first determination module 706 determines no metadata update has been received, then the second synchronization process 700 proceeds to a second determination module 710.

The second determination module 710 determines whether the update includes any changes to the content of the document. For example, the second determination module 710 can determine whether any data units have been added, deleted, revised, or moved. If the second determination module 710 determines a content update has not been received, then the second synchronization process 700 cycles back to the receive operation 704 to begin again. However, if the second determination module 710 determines a content update has been received, then the second synchronization process 700 proceeds to an indicate operation 712.

The indicate operation 712 alerts the first user that a content update is available for viewing. For example, the indicate operation 712 can display a graphic, text box, numerical indicia, or other message indicating the availability of the content update. In one embodiment, the indicate operation 712 provides information to the user indicating how many updates are available. Other information about the updates (e.g., user who made the updates, timestamp, etc.) also may be indicated.

A third determination module 714 determines whether the authoring application has received instructions from the first user (either explicitly or implicitly) to view and/or instantiate the content updates. For example, the third determination module 714 can determine whether the user has selected a view option (e.g., via a button, menu, or other interface tool) of the authoring application. In another embodiment, the third determination module 714 may determine the user has selected an auto-instantiate option. If the third determination module 714 determines the authoring application has not received such instructions from the first user, then the second synchronization process 700 cycles back to the receive operation 704 and begins again.

If the third determination module 714 determines the authoring application has received instructions from the first user, then an instantiate operation 716 displays the content updates to the first user. For example, in one embodiment, the instantiate operation 716 can merge the available content updates into the first user's copy of the document. In another embodiment, the instantiate operation 716 can annotate the first user's copy of the document to indicate which content has changed. Additional annotations can indicate which users made which changes. In one embodiment, the instantiate operation 716 performs conflict resolution between the user copy and the updates. The second synchronization process 700 completes and ends at a stop module 718.

Figure 10:
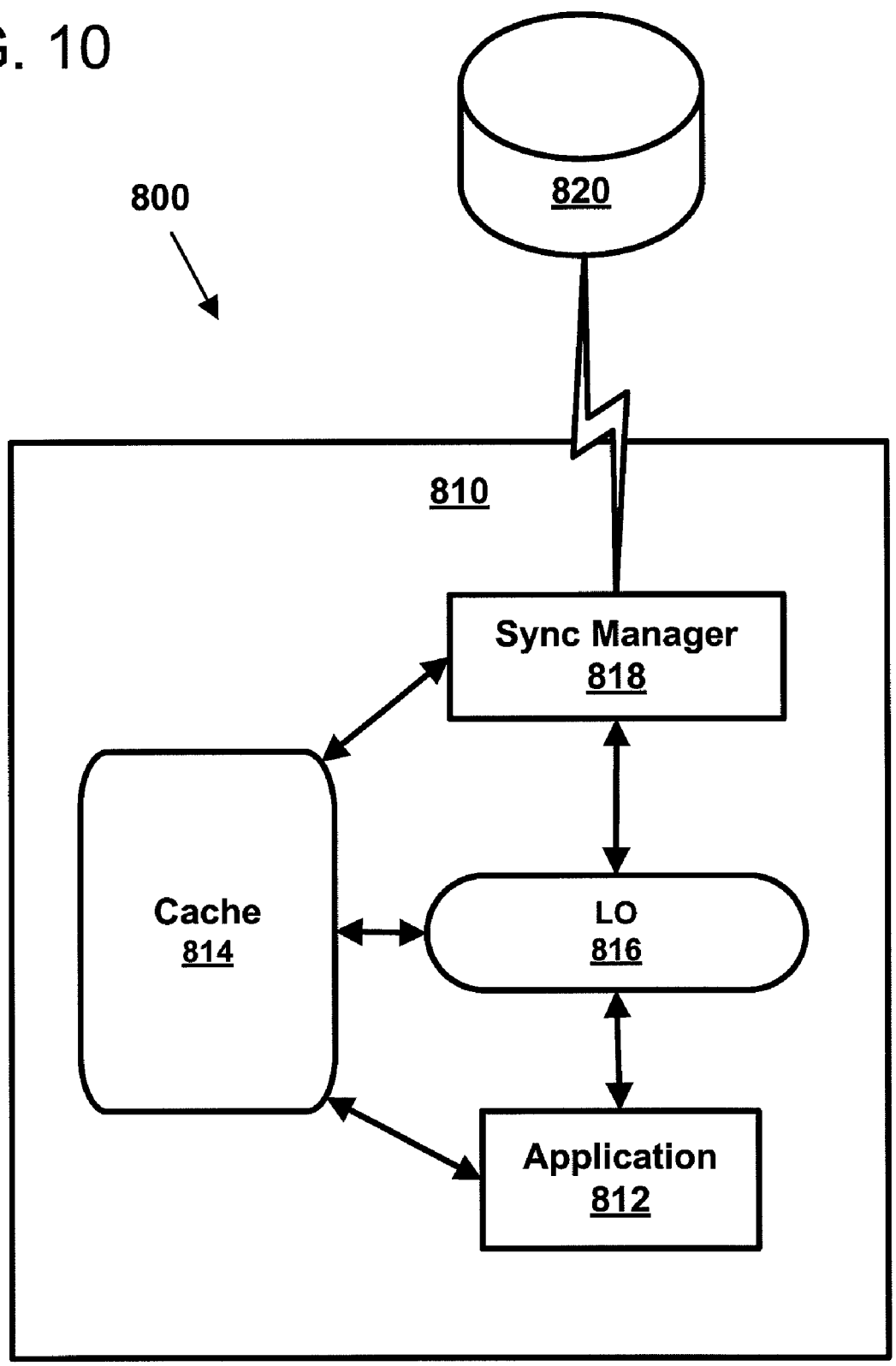
FIG. 10 is a schematic block diagram of an authoring environment including a first computing device on which a master copy of a document to be authored is to be stored in accordance with the principles of the present disclosure.
Figure 11:
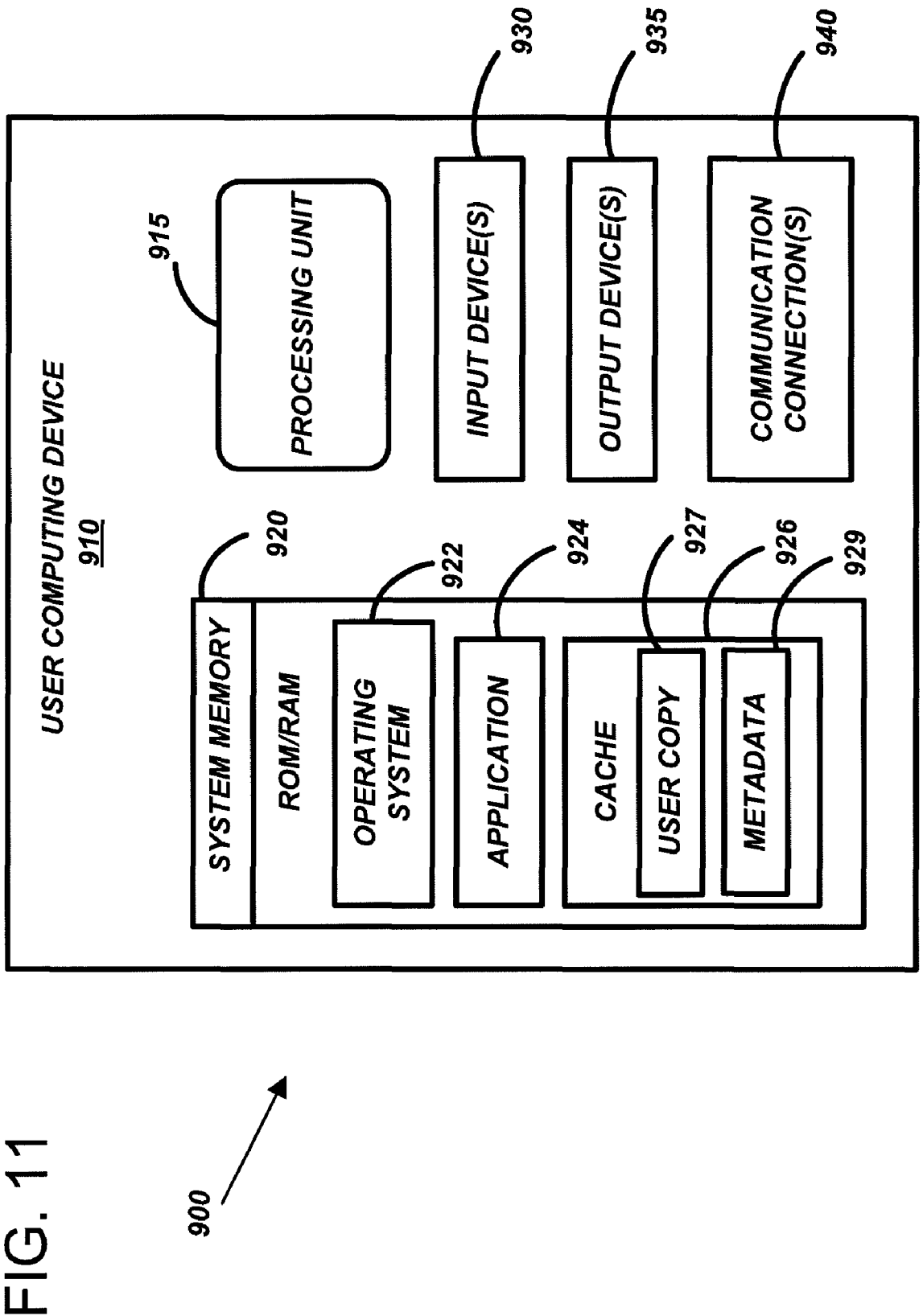
FIG. 11 is a schematic block diagram of a user computing system configured to implement an authoring environment in accordance with the principles of the present disclosure.
Figure 12:
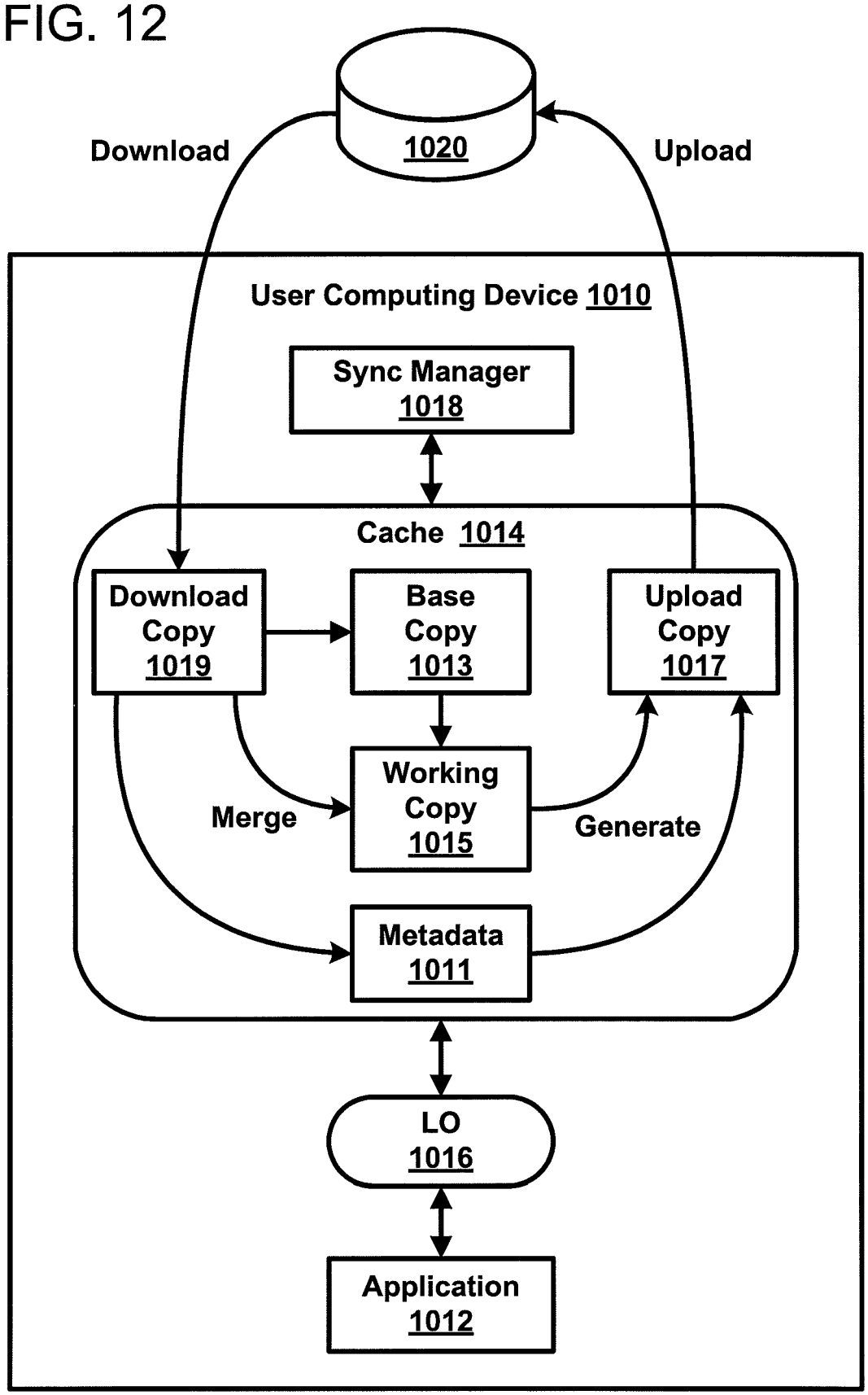
FIG. 12 is a schematic block diagram of an authoring system illustrating a synchronization cycle implemented by the authoring application on the user computing device in accordance with the principles of the present disclosure.

FIGS. 10-12 provide greater detail in how synchronization between the user copy and the master copy of the document is implemented by a user computing device. FIG. 10 is a schematic block diagram of an authoring system 800 including a storage device 820 on which a master copy of a document to be authored is to be stored. The authoring system 800 also includes at least one user computing device 810 communicatively coupled to the storage device 820.

The user computing device 810 includes an authoring application 812 configured to provide an authoring environment in which a user can create and/or manipulate a document to be authored. The user computing device 810 also includes a cache 814, a layer object ("LO") 816, and a synchronization manager ("sync manager") 818. The cache 814 stores a user copy of the document to be authored. The cache 814 also stores the metadata, including lock and presence metadata, associated with the document. Updates to the content and metadata of the document also can be stored in the cache 814.

The layer object 816 provides an interface between the authoring application 812 and the cache 814. The layer object 816 also provides an interface between the authoring application 812 and the sync manager 818. The sync manager 818 communicates with the storage device 820 and provides an interface between the storage device 820 and the cache 814. For example, the sync manager 818 can send updates to and obtain updates from the storage device 820 and the cache 814.

In general, an authoring environment having features that are examples of inventive aspects in accordance with the principles of the disclosure can be implemented on a user computing device (e.g., a personal computer, a server computer, a notebook computer, a PDA, a Smartphone, or any other such computing device). A non-limiting embodiment of a user computing system 900 configured to implement an authoring environment is described herein with reference to FIG. 11.

In FIG. 11, the exemplary computing system 900 for implementing the principles of the disclosure includes a user computing device, such as user computing device 910. In a basic configuration, the user computing device 910 typically includes at least one processing unit 915 for executing applications and programs stored in system memory 920. Depending on the exact configuration and type of computing device 910, the system memory 920 may include, but is not limited to, RAM, ROM, EEPROM, flash memory, CD-ROM, digital versatile disks (DVD) or other optical storage devices, magnetic cassettes, magnetic tape, magnetic disk storage or other magnetic storage devices, or other memory technology.

System memory 920 typically stores an operating system 922, such as the WINDOWS® operating systems from MICROSOFT CORPORATION of Redmond, Wash., suitable for controlling the operation of the computing device 910. System memory 920 also may include a document cache 926 in which a user copy 927 of a document can be stored. Metadata 929 of the document also can be stored within the user cache 926.

The system memory 920 also may store one or more software applications, such as authoring applications 924 for creating and editing documents. One non-limiting example of an authoring application 924 suitable for authoring documents in accordance with the principles of the present disclosure is MICROSOFT® OFFICE WORD authoring software from MICROSOFT CORPORATION of Redmond, Wash. Other non-limiting examples of authoring applications include POWERPOINT® presentation software and VISIO® drawing and diagramming software, both also from MICROSOFT CORPORATION of Redmond, Wash.

Computing device 910 also may have input device(s) 930, such as a keyboard, mouse, pen, voice input device, touch input device, etc., for entering and manipulating data. Output device(s) 935, such as a display screen, speakers, printer, etc., also may be included. These output devices 935 are well known in the art and need not be discussed at length herein.

The computing device 910 also may contain communication connections 940 that allow the device 910 to communicate with other computing devices, for example, the storage device 820 of FIG. 10, over a network in a distributed computing environment (e.g., an intranet or the Internet). By way of example, and not limitation, communication device media 940 includes wired media such as a wired network or direct-wired connection, and wireless media, such as acoustic, RF, infrared and other wireless media.

FIG. 12 is a schematic block diagram of an authoring system 1000 illustrating the synchronization cycle implemented by the authoring application on the user computing device. The authoring system 1000 includes a storage device 1020 on which the document to be authored is to be stored and a user computing device 1010. The user computing device 1010 includes an authoring application 1012, a cache 1014, a layer object 1016, and a sync manager 1018. The cache 1014 of the user computing device 1010 is configured to store a base copy 1013 of the document to be authored, a working copy 1015, an upload copy 1017, and a download copy 1019. The cache 1014 also is configured to store metadata 1011 of the document.

Figure 13:
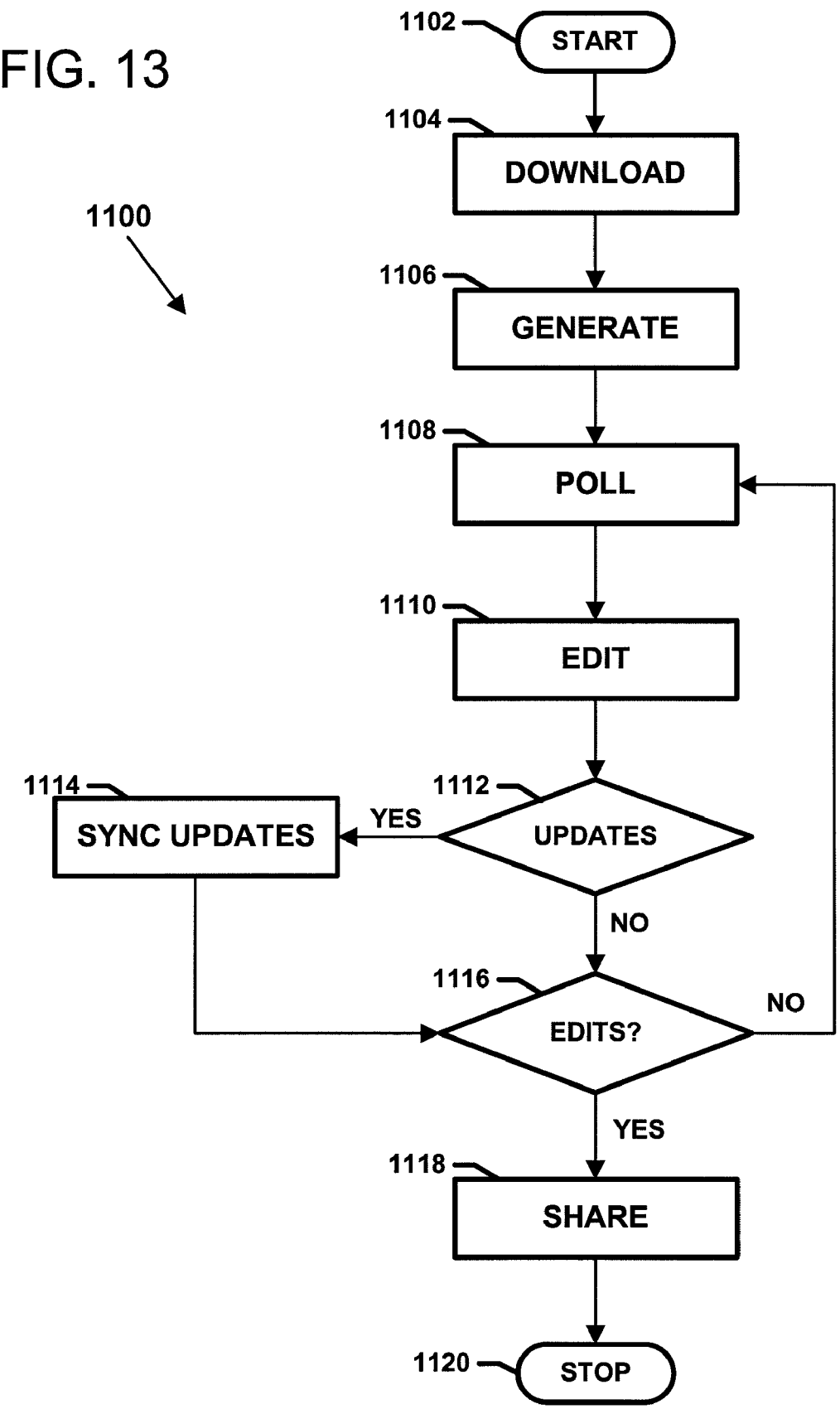
FIG. 13 is a flowchart illustrating an operational flow for another exemplary synchronization process by which a user computing system can send and receive updates while editing a document in accordance with the principles of the present disclosure.

FIG. 13 is a flowchart illustrating an operational flow for an exemplary synchronization process 1100 by which a user computing system, such as user computing device 1010, can send and receive updates while authoring a document. The synchronization process 1100 initializes and begins at a start module 1102 and proceeds to an obtain operation 1104. The obtain operation 1104 causes the sync manager 1018 of the user computing device 1010 to obtain from the storage device 1020 a download copy 1017 of the document to be authored. The download copy 1017 of the document reflects the state of the master copy of the document at the time the document is obtained from the storage device 1020. For example, the obtain operation 1104 can cause the sync manager 1018 to pull from the storage device 1020 a copy of the most recent version of the master copy of the document.

A generate operation 1106 creates a base copy 1013 and a working copy 1015 of the document based on the download copy 1017. The working copy 1015 of the document can be manipulated by the authoring application 1012 to allow the user to edit the document. Accordingly, the working copy 1015 reflects the current state of the document as edited by the user of the authoring application 1012. The base copy 1013 reflects the state of the document at the time just before the user begins editing the document. In one embodiment, the layer object 1016 generates the base copy 1013 of the document and the working copy 1015 and provides the working copy 1015 to the authoring application 1012.

To obtain content updates generated by other users, a poll operation 1108 causes the sync manager 1018 to contact the storage device 1020 periodically to obtain an updated download copy 1017 of the document being authored. The download copy 1017 reflects the state of the master copy of the document at the time of download. The master copy is stored on storage device 1020 and may include changes made by other users since the base copy 1013 was generated. The sync manager 1018 stores any updated download copy 1017 of the document in the cache 1014.

An edit operation 1110 receives any instructions provided by the user to the authoring application 1012 to perform an editing operation on the document. The application 1012 makes the edits to the working copy of the document 1015. The authoring application 1012 also makes metadata changes as appropriate when implementing the editing operations.

At a first determination module 1112, the layer object 1016 checks the cache 1014 to determine whether any updates have been received during the poll operation 1108 (i.e., whether an updated download copy 1017 is available in the cache 1014). In one embodiment, the first determination module 1112 is performed at periodic intervals regardless of whether the user has edited the working copy of the document. In different embodiments, the first determination module 1112 can be performed, e.g., every few seconds, milliseconds, or minutes.

If the layer object 1016 determines a new download copy 1017 is not available, then the synchronization process 1100 proceeds to a second determination module 1116, which will be discussed in greater detail below. If the layer object 1016 determines a new download copy 1017 is available, however, then the synchronization process 1100 proceeds to a sync operation 1114. In one embodiment, the sync operation 1114 automatically instantiates any metadata updates found in the download copy 1017 without requiring any interaction with the user of the authoring application 1012. For example, the layer object 1016 may automatically instantiates any lock metadata reflected in the download copy 1017 into the working copy 1015 of the document.

In some embodiments, the sync operation 1114 does not automatically instantiate any content updates from the download copy 1017 into the working copy 1015. Rather, the sync operation 1114 only instantiates content updates when the user of the authoring application 1012 provides instructions to integrate the content updates. In other embodiments, however, the sync operation 1114 automatically instantiates the content updates. In one embodiment, the sync operation 1114 causes the layer object 1016 to merge the updated download copy 1017 with the working copy 1015 when instructions to integrate are provided. In one embodiment, the sync operation 1114 is the same as the second synchronization process 700 shown in FIG. 9. In other embodiments, however, other synchronization processes can be used to integrate the updates with the working copy 1015 of the document. The synchronization process 1100 proceeds from the sync operation 1114 to the second determination module 1116.

The second determination module 1116 determines whether the user made any changes to the working copy 1015 of the document or to the metadata 1011 of the document during the edit operation 1110. If the second determination module 1116 determines that no edits (i.e., neither content nor metadata) have been made, then the synchronization process 1100 cycles back to the poll operation 1108 and begins again. If the second determination module 1116 determines the user has made content edits (e.g., revising a data unit of the document) and/or metadata edits (e.g., locking a data unit of the document), however, then a share operation 1118 synchronizes the edits with the storage device 1020.

The share operation 1118 causes the sync manager 1018 of the user computing device 1010 to send automatically to the storage device 1020 any changes to the metadata of the document without requiring any interaction from the user of the authoring application 1012. In one embodiment, the share operation 1118 does not cause the sync manager 1018 to send content updates to the storage device 1020 automatically. Rather, the sync manager 1018 only sends content updates to the storage device 1020 when instructed to do so by the layer object 1016. Automatically pushing only metadata may enhance the user experience by increasing update efficiency, reduce network bandwidth usage, and provide conflict inhibition without requiring auto-syncing of content. In other embodiments, however, the share operation 1118 automatically pushes content as well as metadata. In one embodiment, the share operation 1118 is the same as the first synchronization process 600 of FIG. 8. In other embodiments, however, other synchronization processes can be utilized.

For example, when the user wishes to share content revisions made by the user, the user will instruct the authoring application 1012 to submit the revisions to the storage device 1020 for integration with the master copy of the document. In one embodiment, the authoring application 1012 will instruct the layer object 1016 to generate an upload copy 1019 of the document. Generally, the layer object 1016 generates the upload copy 1019 based on the working copy 1015. The sync manager 1018 attempts to push the upload copy 1019 to the storage device 1020. The synchronization process 1100 completes and ends at a stop module 1120.

In some embodiments, the share operation 1118 cannot send content updates to the storage device 1020 until all previous content updates received from the storage device 1020 have been instantiated into the working copy 1015 of the document. In such embodiments, the upload copy 1019 can be generated by merging the working copy 1015 of the document with the most recently obtained download copy 1017. In one embodiment, the sync manager 1018 polls the storage device 1020 for an updated download copy 1017 when the layer object 1016 attempts to generate an upload copy 1019.

If the sync manger 1018 fails to push the upload copy 1019 to the storage device 1020 (e.g., if the upload copy 1019 does not reflect the most recent changes instantiated into the master copy), then the sync manager 1018 retry with a revised update document 1019. For example, the sync manager 1018 may obtain a new download copy 1017 from the storage device 1020 and the layer object 1016 may generate a new upload copy from the working copy and the new download copy 1017. In one embodiment, the sync manager 1018 will continue to revise and push an upload copy 1019 to the storage device 1020 until successful.

Referring to FIGS. 14-31, the principles of the present disclosure can be better understood by walking through some example applications. FIGS. 14-26 represent changes made to a cache of a storage device, a cache 1214 a first user computing device, and a cache 1234 of a second user computing device during a collaborative authoring session in which a first user and a second user edit a document concurrently. In other embodiments, however, the first and second users can edit the document at different times using the same processes.

Figure 14:
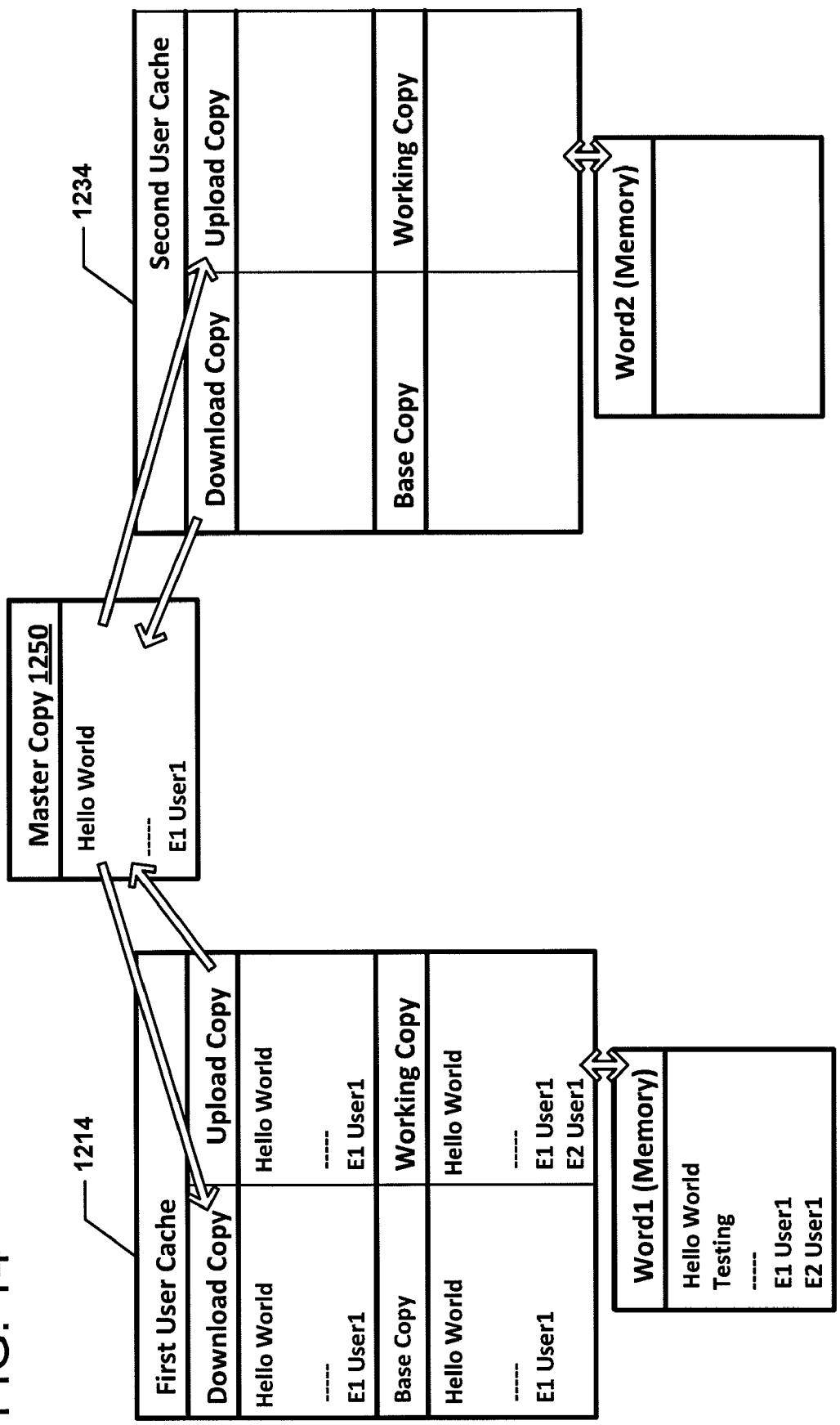
FIGS. 14-26 are schematic block diagrams of the caches stored on a first computing device, a first user computing device, and a second user computing device at different points in time during a collaborative authoring session in which a first user and a second user of the first and second user computing devices edit a document concurrently in accordance with the principles of the present disclosure.

In FIG. 14, the first user has created a document and saved an initial draft of the document to a storage device as a master copy 1250. Alternatively, the first user may have accessed the master copy 1250 of an existing document. The second user has not yet accessed the document.

The master copy 1250 of the document has a corresponding master lock table. For the sake of convenience, in the example shown in FIGS. 14-26, the master lock table is displayed as part of the master copy 1250. In other embodiments, however, the master lock table can be stored separately from the master copy 1250 of the document. Similarly, for ease in understanding, locks associated with each copy of the document (e.g., base copy, working copy, download copy, and upload copy) stored on a user cache 1214, 1234 are shown in FIGS. 14-26 as part of the copy. In other embodiments, however, metadata may be separately stored for each document copy or for each user.

The master copy 1250 of the document includes a first data unit containing the text "Hello World" and a lock E1 on the first data unit. The lock E1 is owned by (i.e., assigned to) the first user. The content and metadata of the master copy 1250 are reflected in the base copy and download copy stored in the cache 1214 of the first user. Because the first user sent the initial draft of the document to the storage device, the upload copy stored in the cache 1214 also reflects the content and metadata of the master copy 1250.

Since sending the initial draft to the storage device, the first user has edited the working copy of the document to include a second data unit containing the text "Testing." A second lock E2 has been added about the second data unit. In one embodiment, the second lock E2 is a new lock assigned to the user. In another embodiment, the second lock E2 is an extension of the first lock E1. For example, a new unit identifier can be assigned to the first user in a metadata table stored in the cache 1214 of the first user. In one embodiment, the first user creates the second lock E2 by moving a cursor to start a new data unit (e.g., paragraph) and typing "Testing." The first lock E1 is not yet released because the first user has not yet indicated editing on the first data unit is final (e.g., by saving after moving the cursor).

Figure 15:
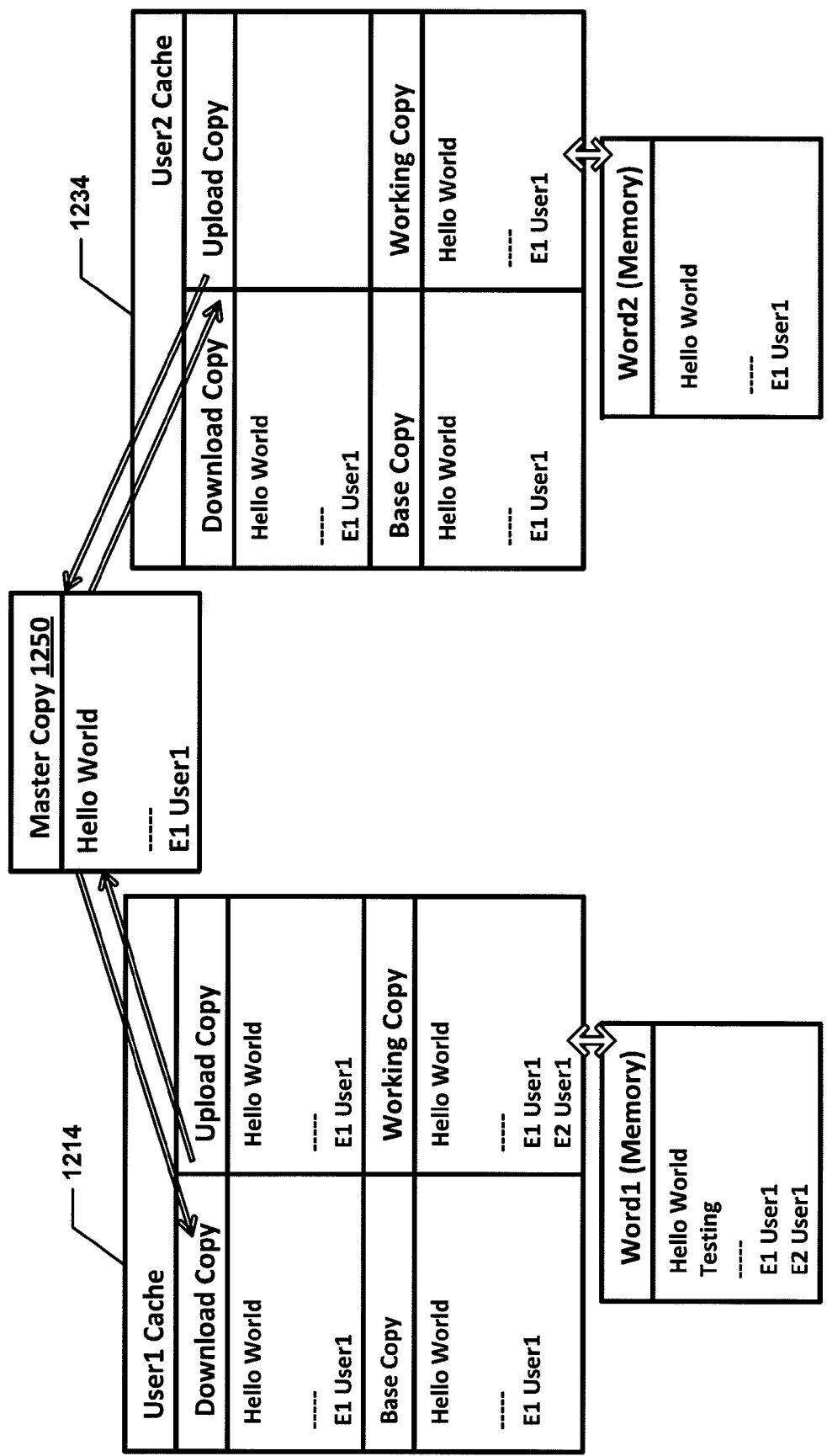

In FIG. 15, the second user accesses the master copy 1250 of the document stored on the storage device. The second user obtains a download copy of the document and stores the download copy into the cache 1234 of the second user. The download copy includes the content and metadata of the master copy 1250. The download copy does not include the most recent content and metadata contained in the working copy of the first user. The layer object of the second user generates a base copy and a working copy of the document based on the download copy. The authoring application utilized by the second user displays the content and any locks of the working copy to the second user.

In some embodiments, the second user can edit the document even before a coauthoring session has been fully established (i.e., before the first and second user computing devices learn of the presence of the other). For example, the second user is allowed to edit the second working copy of the document while the first and second user computing devices exchange greetings (i.e., handshake). Typically, metadata is not exchanged automatically before the first and second computing devices learn of the existence of one another.

Figure 16:
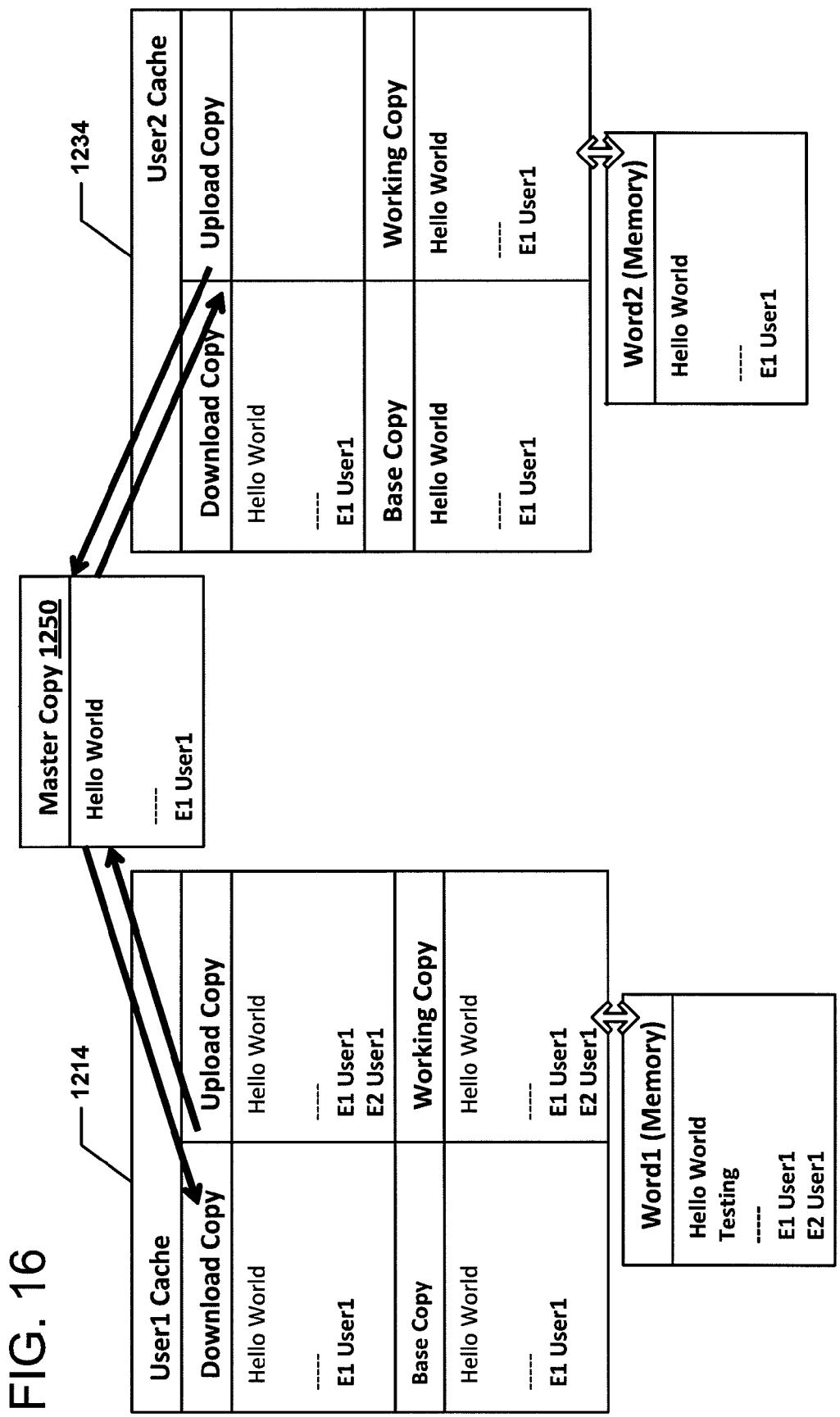

In FIG. 16, the first and second computing devices each have discovered the existence of the other. Accordingly, each of the first and second computing devices has begun transmitting metadata updates automatically to each other. As shown in FIG. 16, the first authoring application provides updated lock metadata (e.g., the second lock) from the lock table of the first user to the storage device 1220 (e.g., via a layer object and sync manager). The authoring application does not provide updated content information to the storage device 1220, however, because no instructions to share content updates have been received from the first user.

Figure 17:
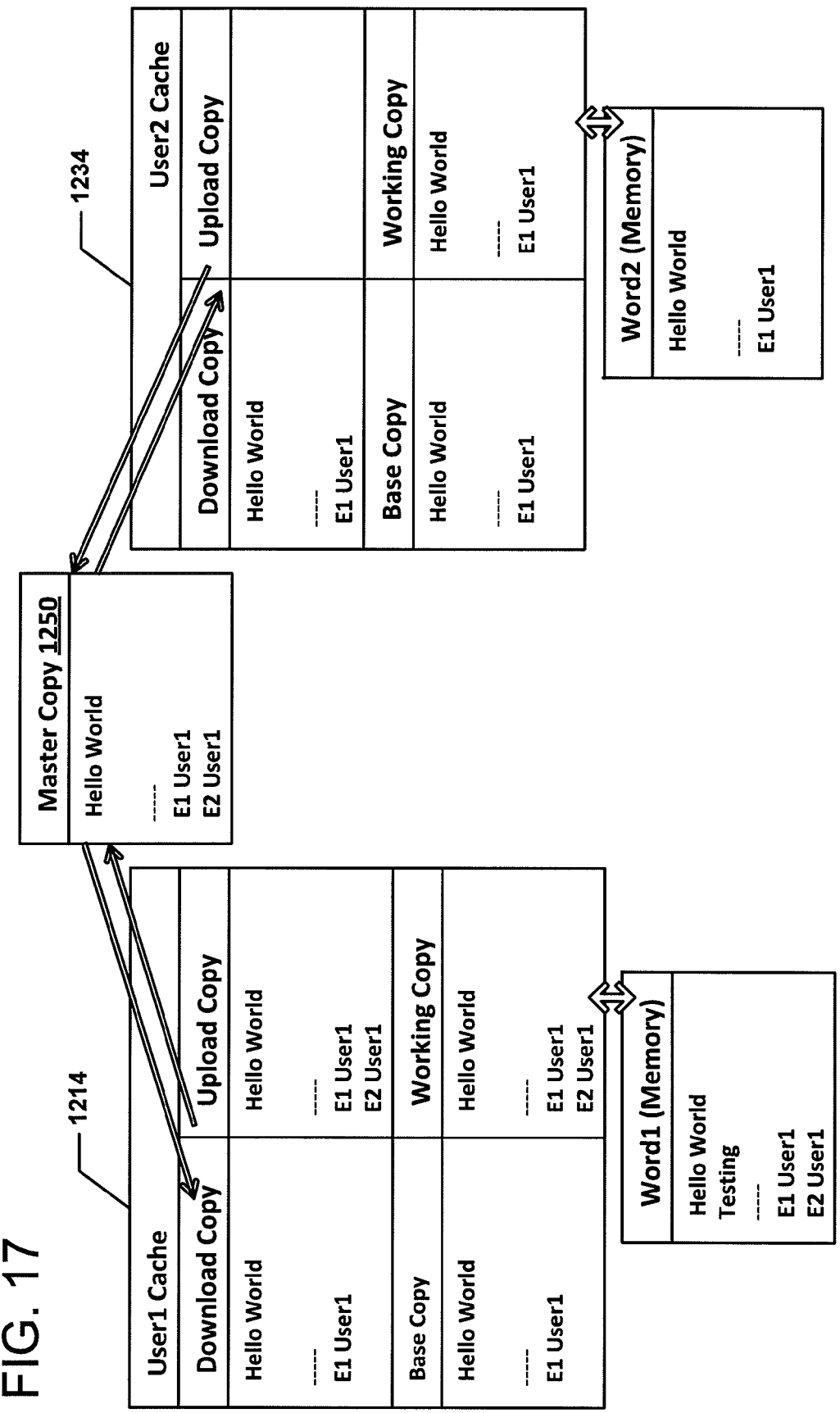
Figure 18:
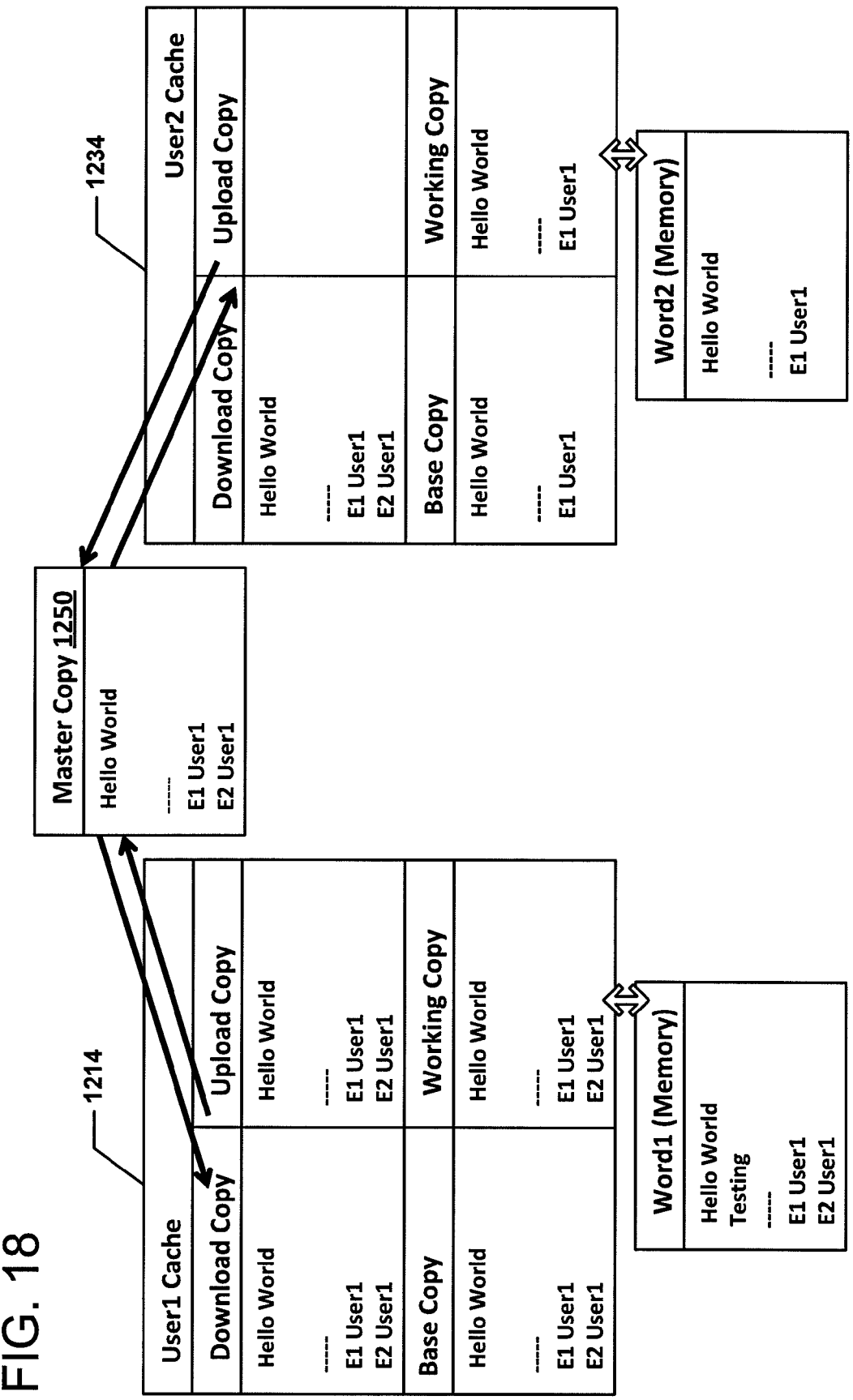

In FIG. 17, the storage device has integrated the updated lock metadata (e.g., the second lock E2) into the master metadata table of the master copy 1250. The lock metadata has not yet been obtained by the second user computing device. In FIG. 18, the second user computing device has polled the storage device and obtained a new download copy of the master copy 1250. A new download copy also has been generated (e.g., via a layer object) on the first cache 1214 based on the upload copy. In another embodiment, the first user computing device also may have polled the storage device and obtained a new download copy of the master copy 1250. Both of the new download copies reflect the updated lock information (e.g., lock E2) from the working copy of the first user.

Figure 19:
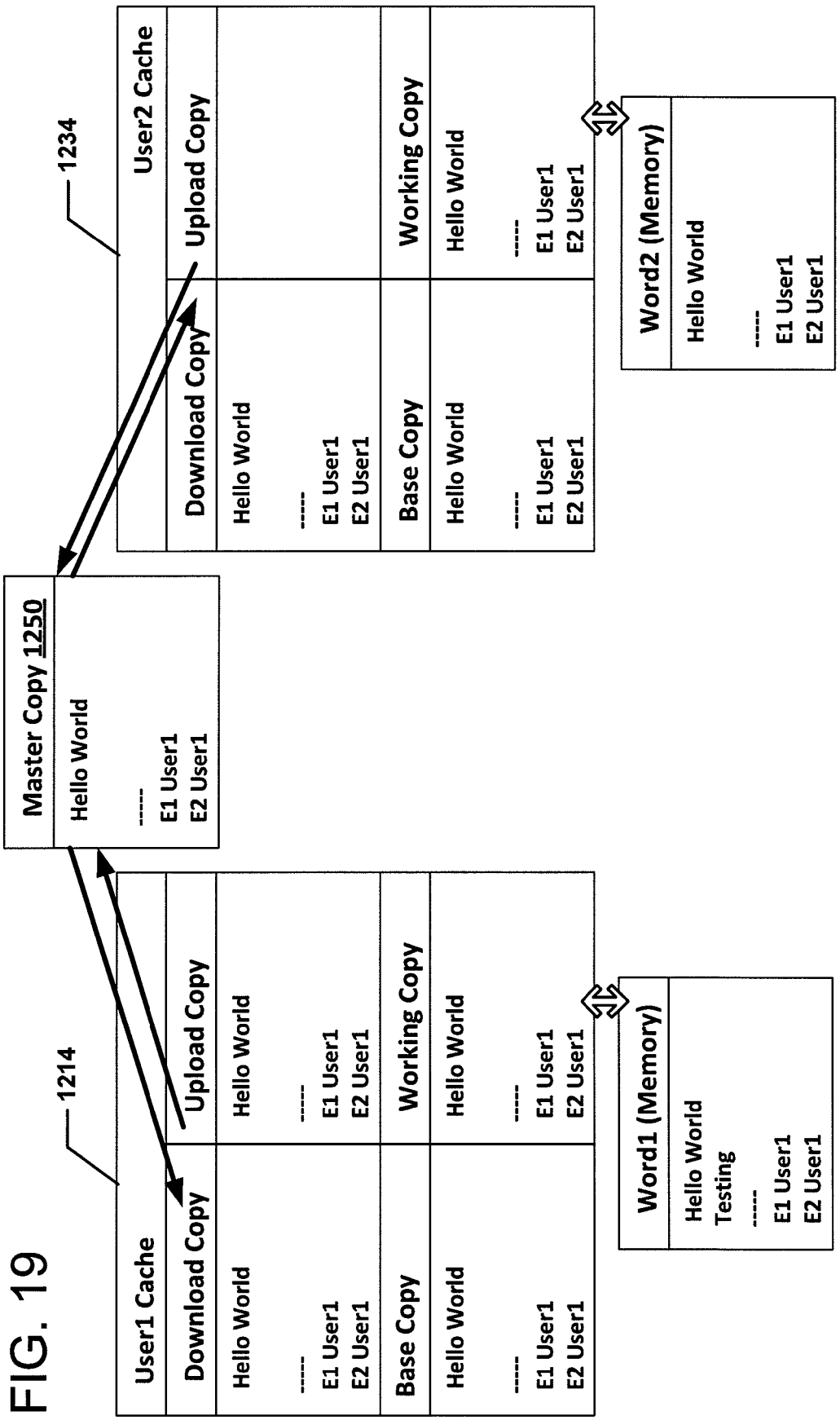

In FIG. 19, the second computing device generates (e.g., via a layer object) a new working copy based on the new download copy. Accordingly, the new working copy of the second computing device contains the second lock E2 on the second data unit. The new working copy does not include the second data unit itself, however. In one embodiment, the working copy of the second user computing device displays a blank/empty data unit and indicates that the blank/empty data unit is locked. In another embodiment, the working copy does not display the second data unit at all and the lock E2 is not indicated to the second user until the second data unit is visible to the second user.

Figure 20:
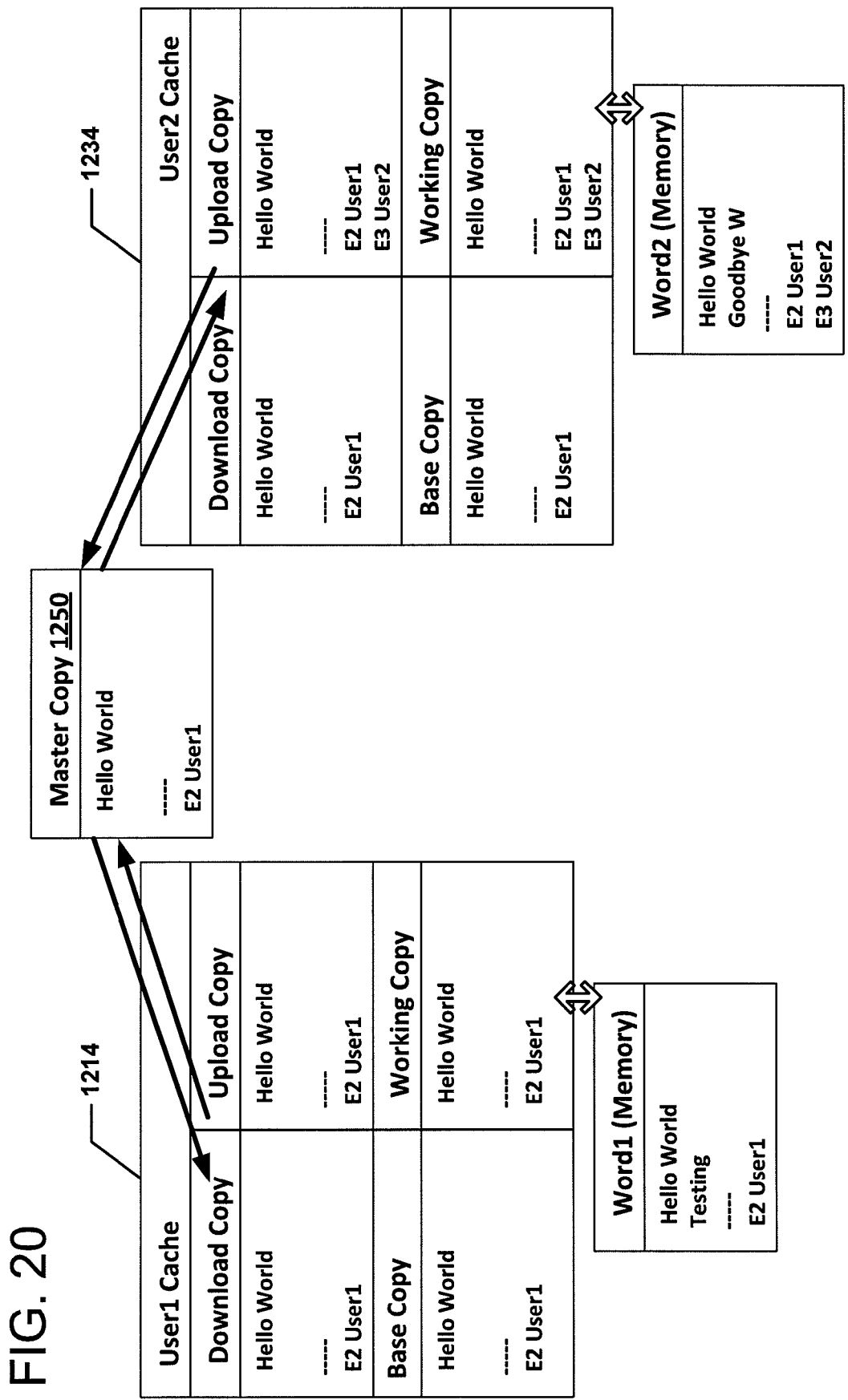

In FIG. 20, the second user adds a third data unit to the document and a third lock E3 around the third data unit (e.g., in the memory of the authoring application). The third data unit contains the text "Goodbye World". The second authoring application generates (e.g., via a layer object) a working copy of the document including the third data unit and the third lock E3. The second authoring application also automatically provides (e.g., via a sync manager) the third lock E3 to the storage device. However, the second authoring application does not provide the third data unit to the storage device.

Also in FIG. 20, the first user releases the first lock E1 after the first user indicates the first user has finished editing the first data unit. For example, the first user can provide instructions to store the document when the cursor of the first user is positioned within the second data unit. In one embodiment, the second data unit may be located remote from the first data unit. In the example shown, the finalization indication provided by the first user does not indicate the first user wishes to share content changes made by the first user. Accordingly, the first authoring application does not generate (e.g., via a layer object) an upload copy containing content changes for distribution to the storage device.

Figure 21:
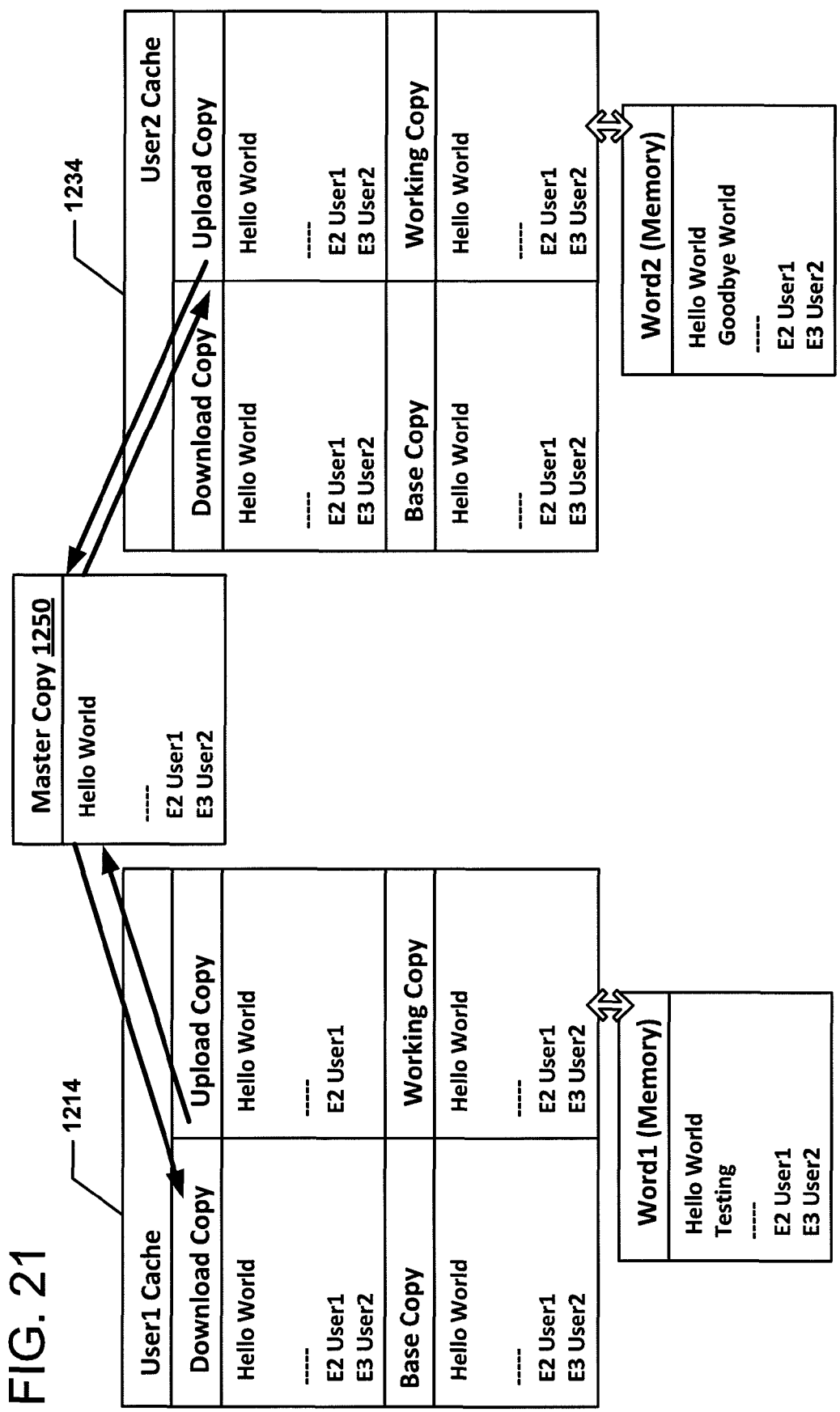

In FIG. 21, the third lock E3 has been stored in the master lock table of the master copy 1250 of the document on the storage device. The first user computing device subsequently polls (e.g., via a sync manager) the storage device to check for updates. The first user computing device obtained (e.g., via a sync manager) a new download copy of the document from the storage device based on the master copy 1250. The new download copy contains the third lock E3. The first authoring application automatically instantiates (e.g., via a layer object) the third lock E3 into the working copy of the first authoring application. As noted above, the third lock E3 optionally may be displayed to the first user using the user interface of the first authoring application.

Figure 22:
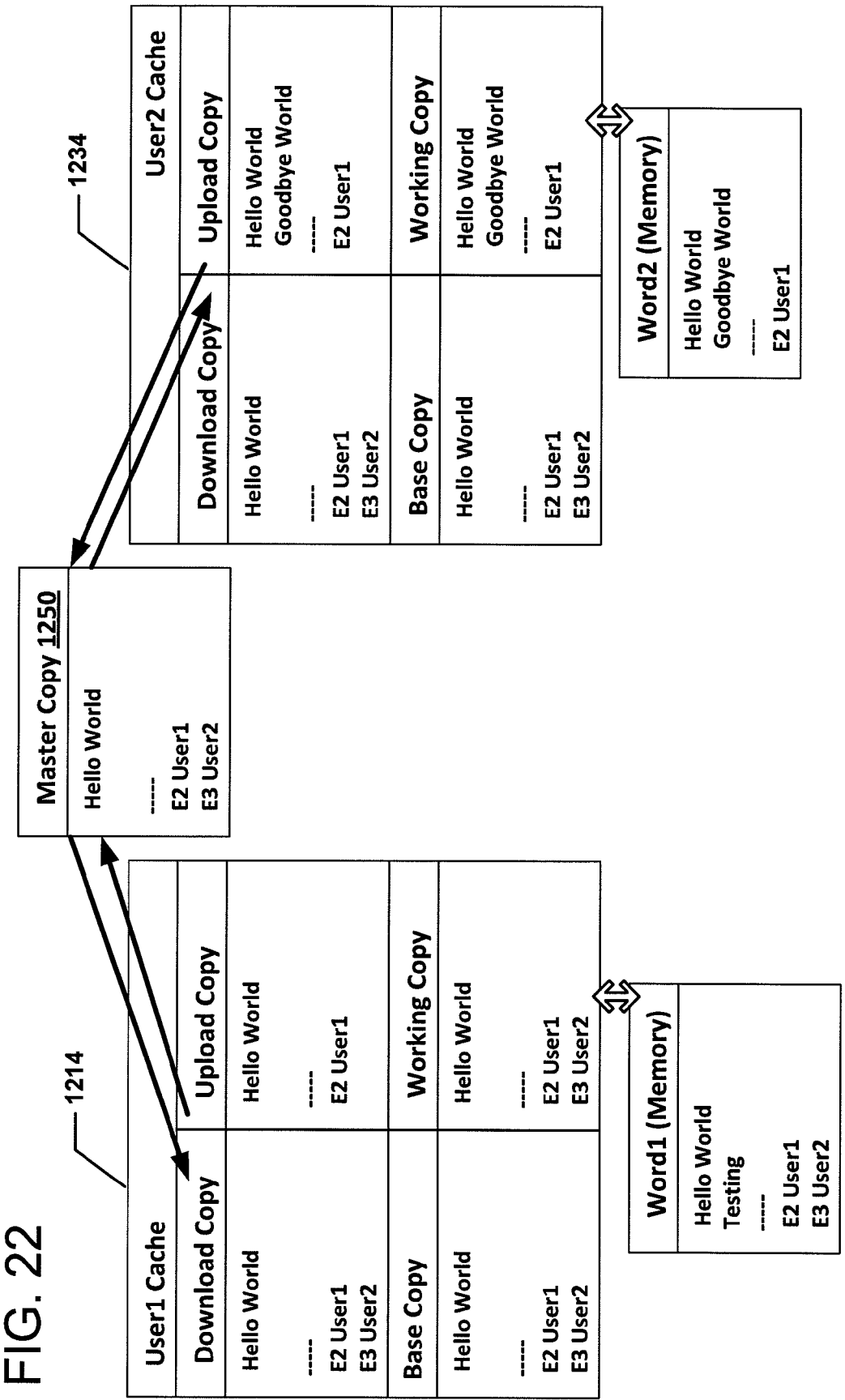

In FIG. 22, the second user releases the third lock E3 when the second user indicates the second user has finished editing the third data unit. The third lock E3 is removed from the metadata table of the second user. In the example block diagram shown in FIG. 22, the third lock E3 is removed from the metadata tables corresponding to the working copy of the second authoring application.

In the example shown in FIG. 22, the finalization indication provided by the second user indicates the second user wishes to share content changes with other users. For example, the second user may remove a cursor from the third data unit and then provide instructions to store the document. Accordingly, the second authoring application may generate an upload copy containing the content changes based on the working copy. In one embodiment, the upload copy also can be based on any content updates (e.g., in this case none) found in the download copy that had not yet been instantiated into the working copy. In the example shown, the upload copy includes the third data unit including the phrase "Goodbye World."

Figure 23:
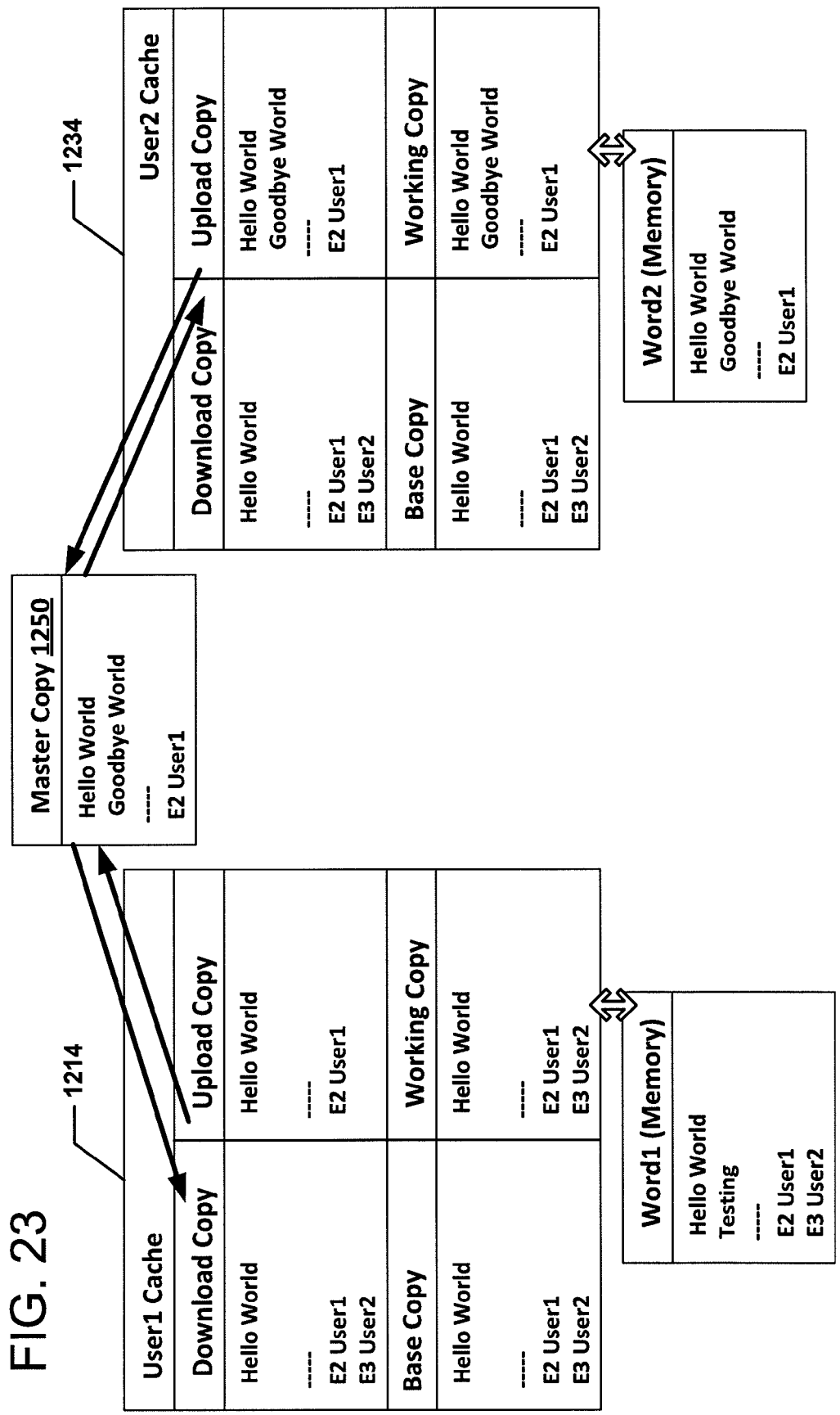
Figure 24:
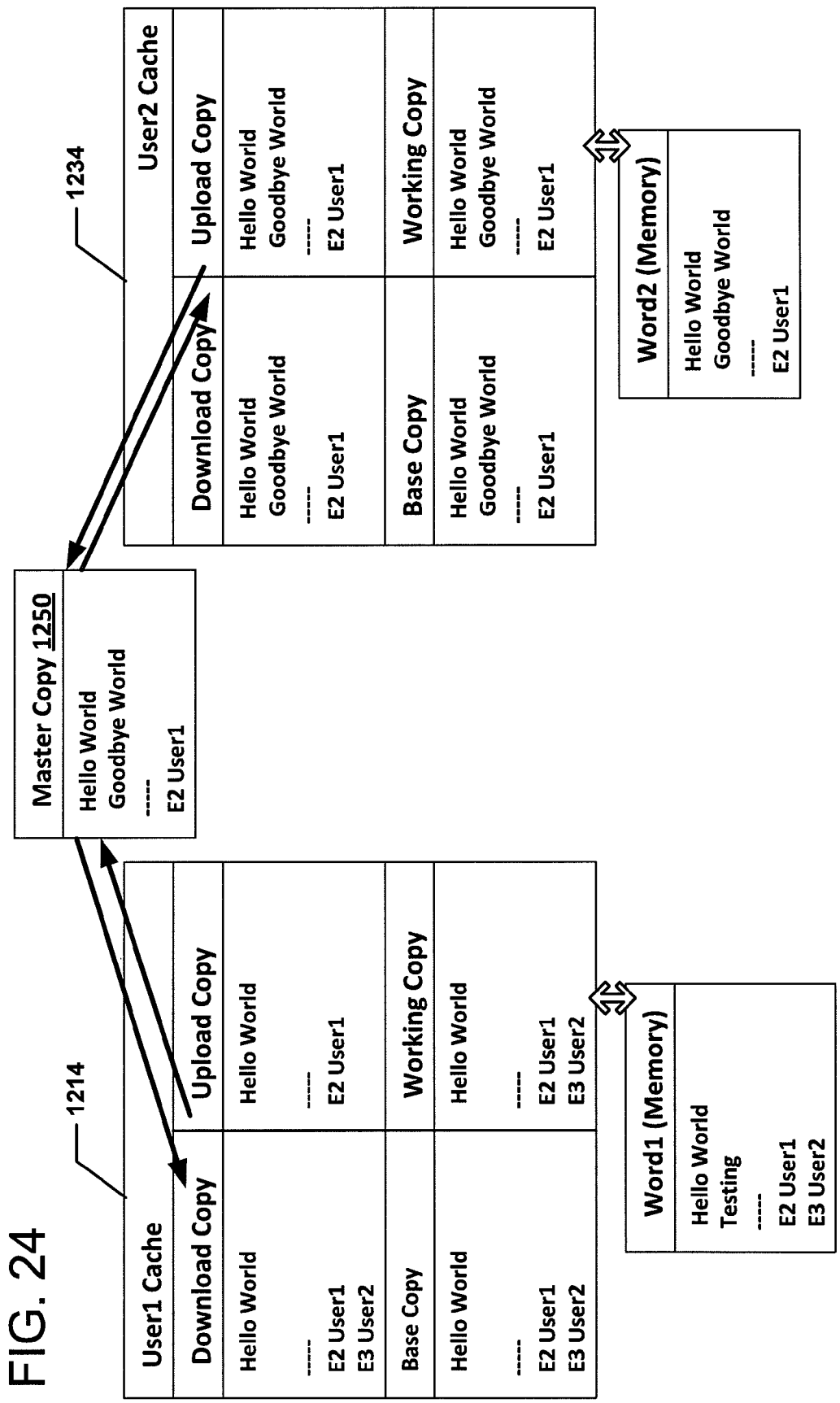

In FIG. 23, the storage device obtains the third data unit from the upload copy of the second user computing device and merges the third data unit into the master copy 1250 of the storage device. The lock table associated with the master copy 1250 indicates the third lock E3 has been released. As shown in FIG. 24, upon a successful push to the storage device, the second authoring application copies (e.g., via a layer object) the upload copy to the download copy and the base copy of the second cache 1234.

Figure 25:
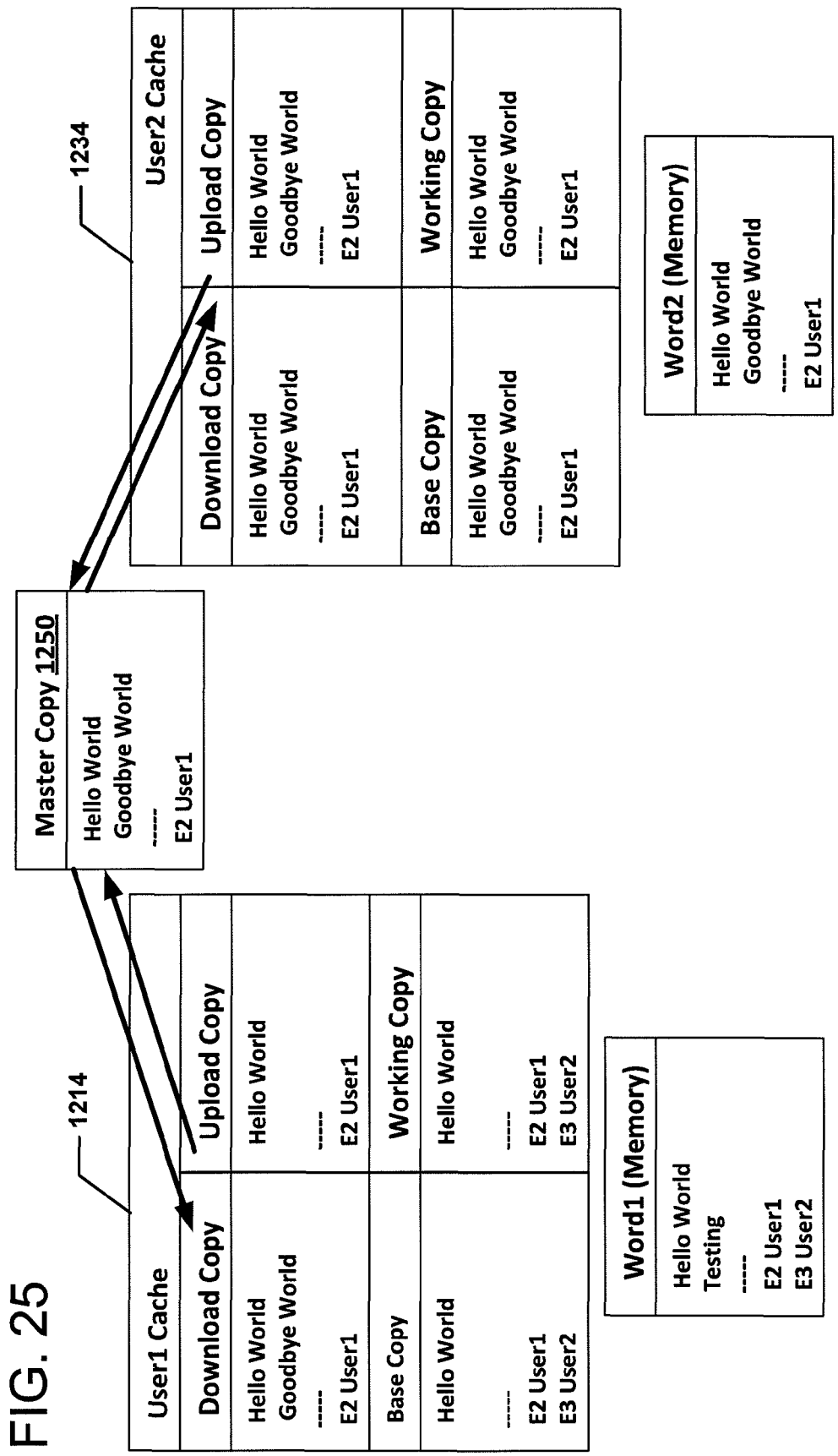

In FIG. 25, the first user computing device obtains (e.g., via a sync manager) a new download copy of the master copy 1250 of the document. The first authoring application determines (e.g., via a layer object) the new download copy has been obtained and determines the new download copy includes content changes. The authoring application automatically merges any new locks (none in this case) into the working copy of the cache 1214. The user interface of the first authoring application may indicate content updates are available for viewing.

Figure 26:
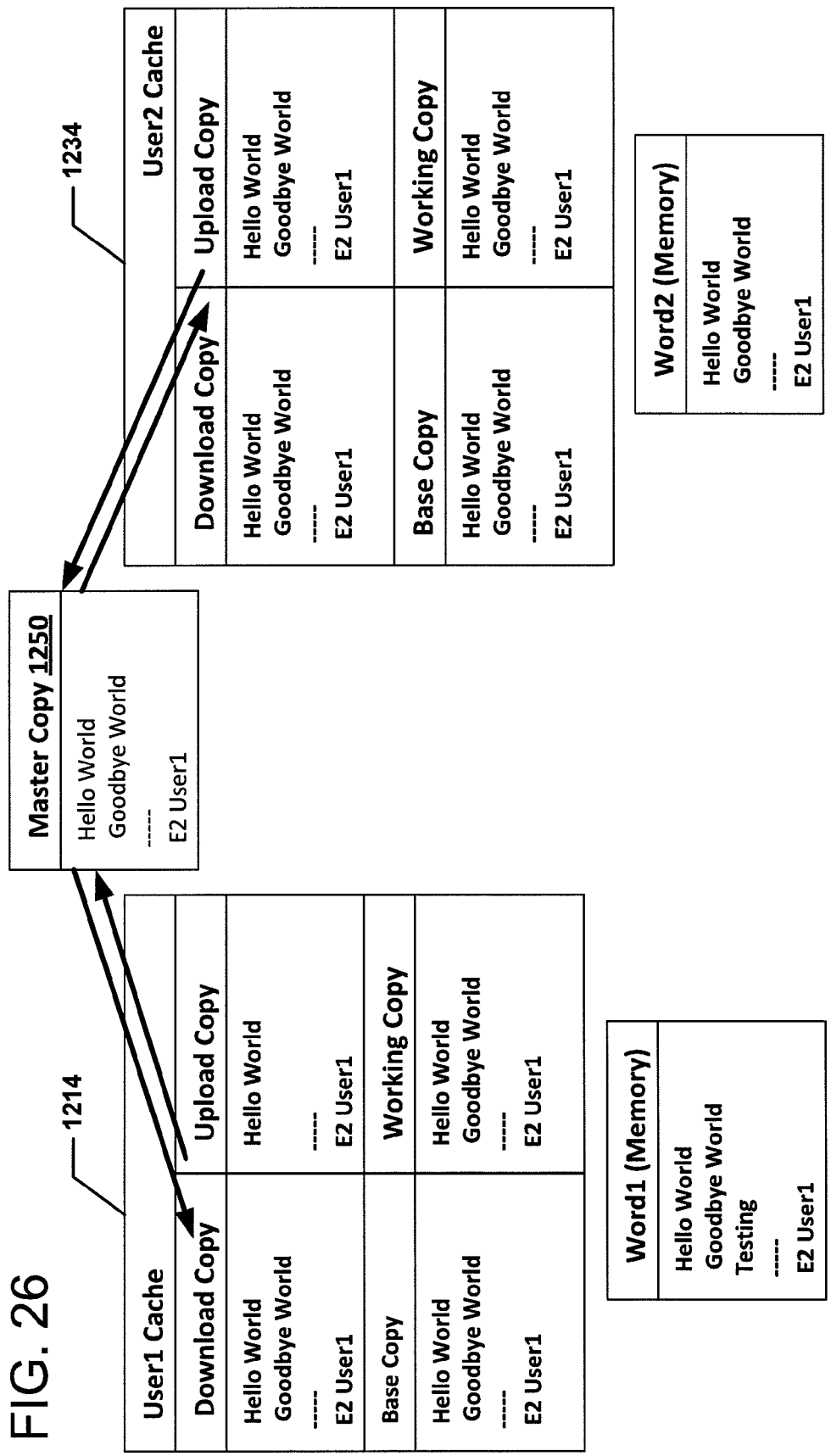
Figure 27:
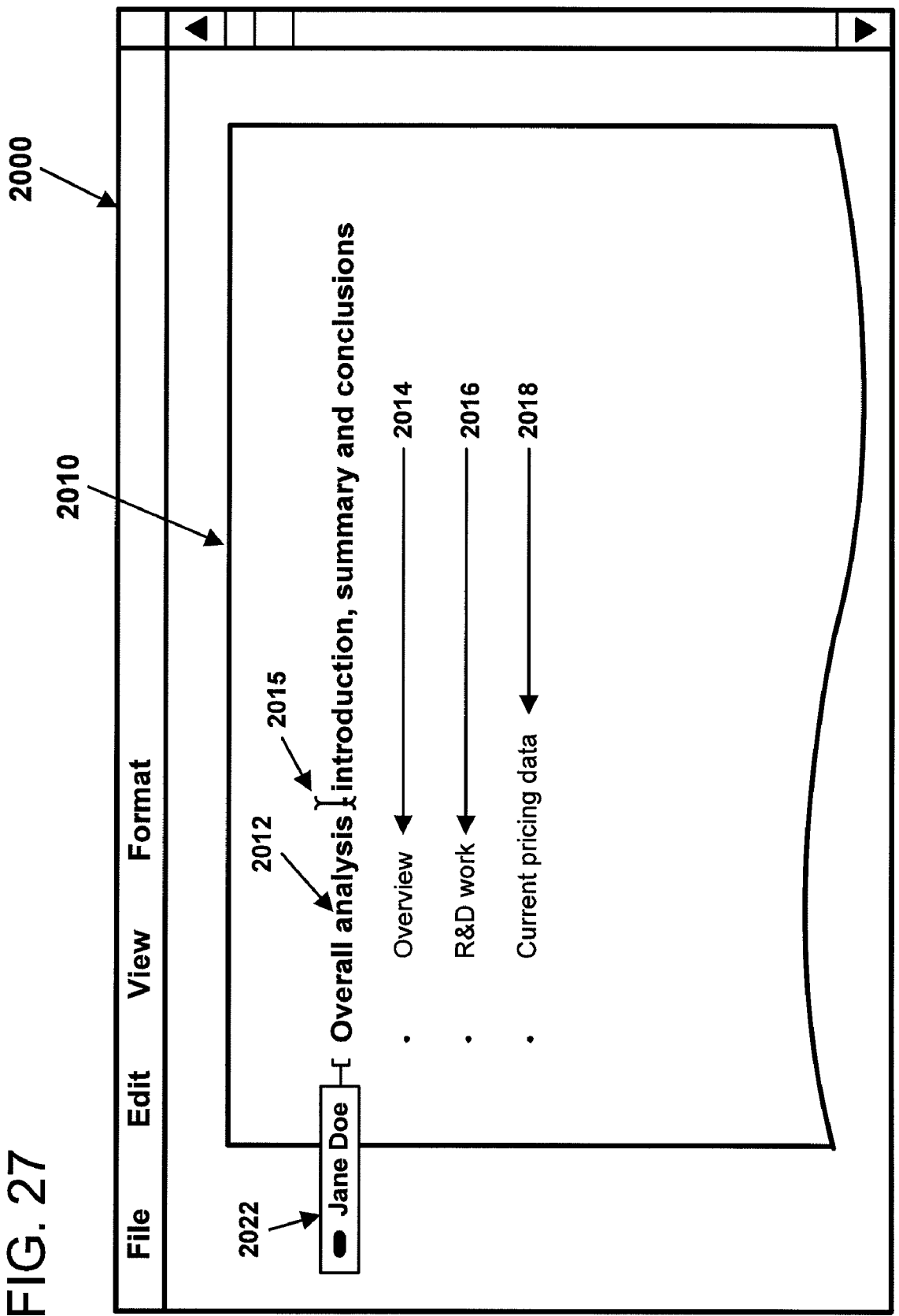
FIGS. 27-31 illustrate changes to an exemplary user interface of a first authoring application as a first user and a second user collaboratively author a document in accordance with the principles of the present disclosure.

In FIG. 26, the first user chooses to instantiate the content updates available in the cache 1214 into the working copy of the document. Accordingly, the authoring application merges the download copy stored in the cache 1214 with the working copy of the first authoring application. The third data unit is added to the working copy of the first authoring application and is displayed to the first user. The third lock E3 is released in the metadata table associated with the working copy of the first authoring application. The first user, therefore, may instruct the first authoring application to edit the third data unit.

Referring now to FIGS. 27-31, the user experience during the coauthoring session is described in detail below. FIGS. 27-31 illustrate changes to an exemplary user interface 2000 of a first authoring application as a first user and a second user collaboratively author a document 2010. The first user, Jane Doe, edits the document 2010 using the first authoring application and the second user, John Doe, edits the document 2010 using a different authoring application.

The document 2010 includes a first data unit 2012, a second data unit 2014, a third data unit 2016, and a fourth data unit 2018. The first user places a content lock 2022 around the first data unit 2012. For example, in one embodiment, the first user may move her cursor 2015 to the first data unit 2012. In another embodiment, the first user may provide instructions to perform one or more editing operations on the first data unit 2012.

Figure 28:
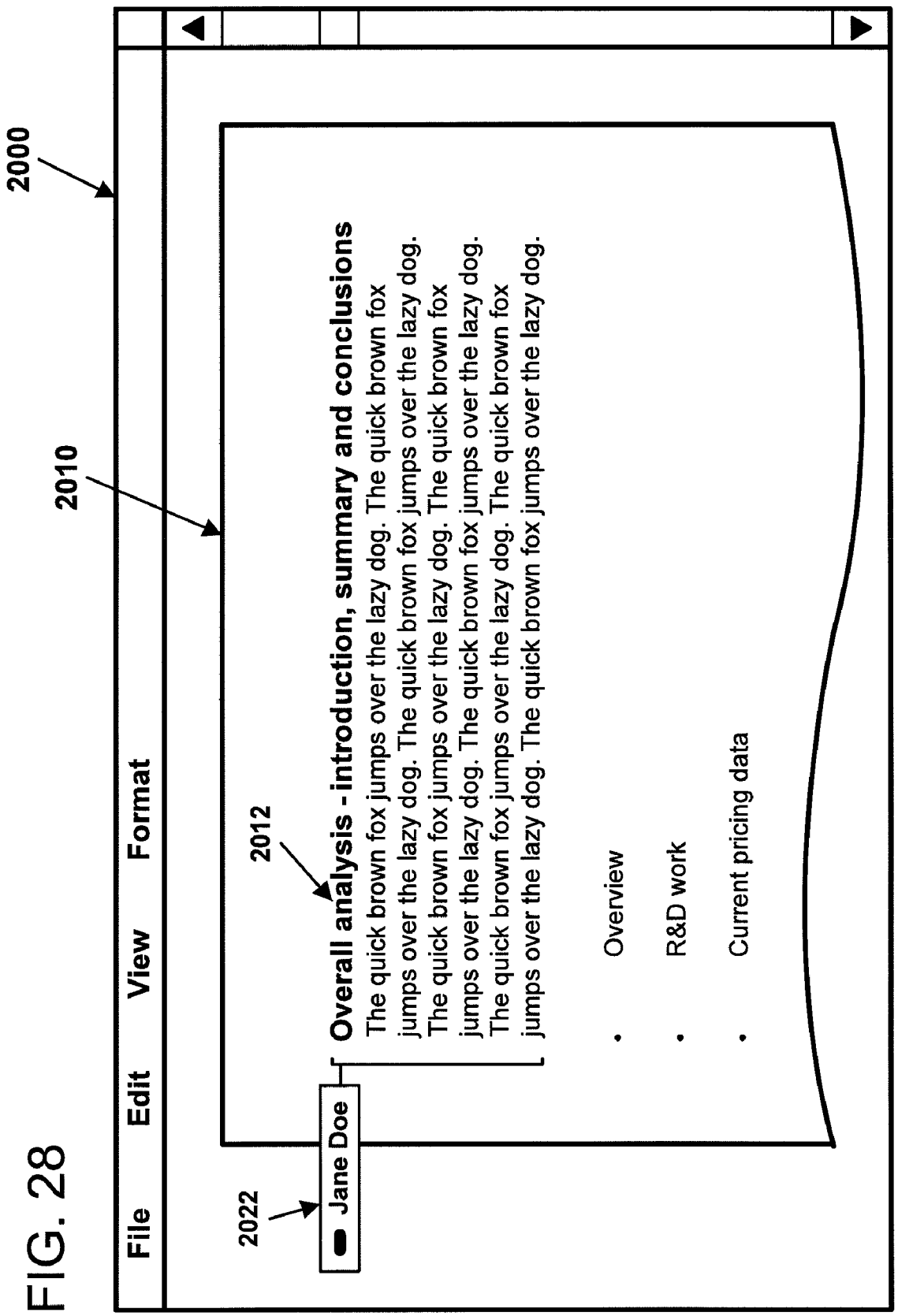

In FIG. 28, the first user has added text to the first data unit 2012. The lock on the first data unit inhibits the second user from editing the first data unit 2012. In one embodiment, the first lock 2022 prevents the second user from editing the first data unit 2012. In another embodiment, the first lock 2022 warns the second user against editing the first data unit 2012, but does not bar editing by the second user. In yet another embodiment, the first lock 2022 merely indicates the first user has expressed an intention to edit the first data unit 2012.

Figure 29:
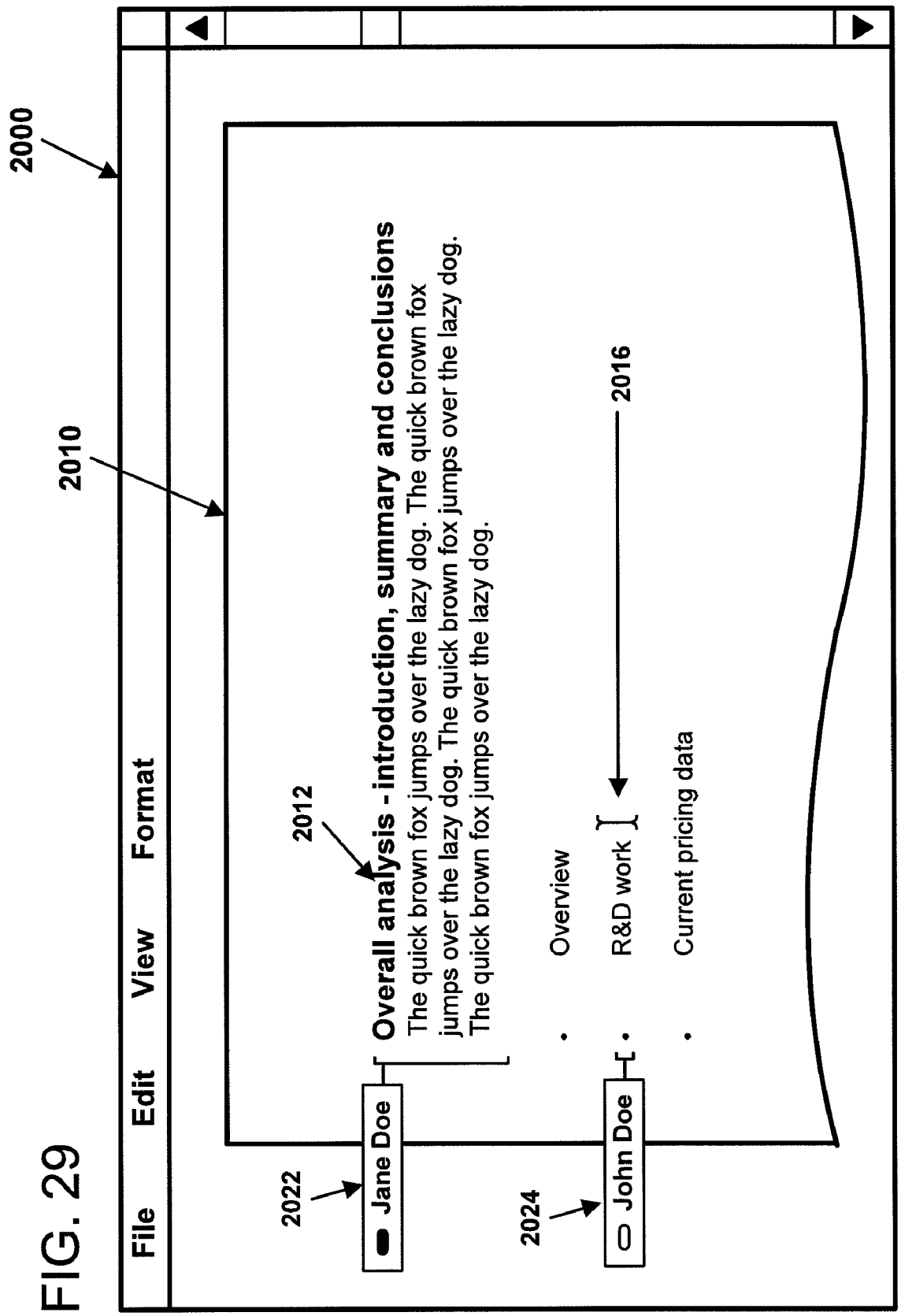

In FIG. 29, the second user has placed a content lock 2024 about the third data unit 2016. Because the second user has chosen to not share his changes, the second lock may be visible on the user interface 2000 of the first authoring application, but any changes made to the third data unit 2016 by the second user are not visible yet. In the example shown, the second lock 2024 is indicated by the user interface 2000 by displaying a bracket indicating the scope of the second lock 2024. The second lock 2024 also can include a nametag indicating the owner of the second lock 2024. In FIG. 29, the nametag includes text identifying the second user and an icon. The icon can further identify a user by color, symbol, or other graphic.

Figure 30:
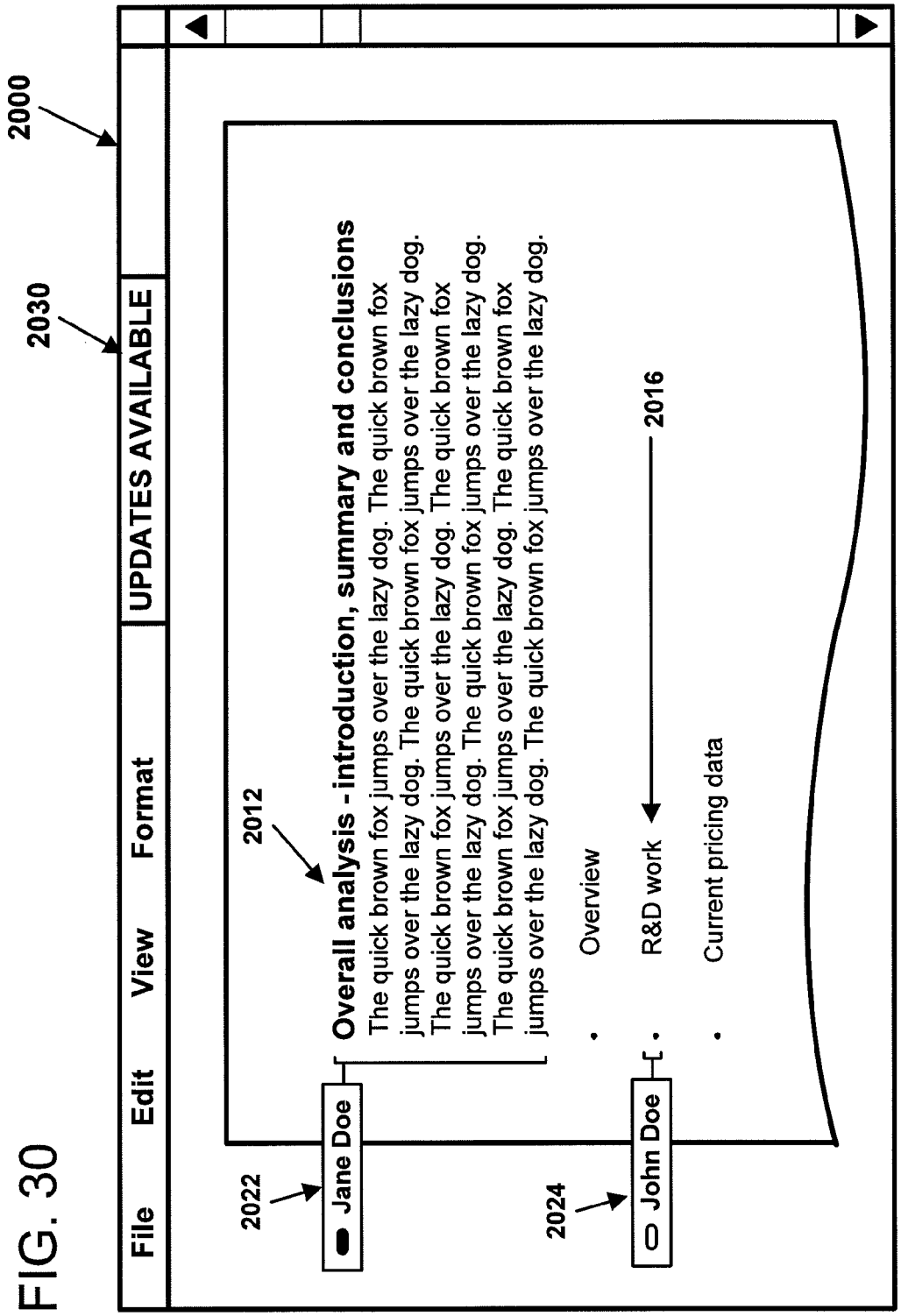

In FIG. 30, the first authoring application receives content updates for the document 2010. The second user has chosen to share content changes with other users and accordingly merged content updates into a master copy of the document 2010 (e.g., via one of the synchronization processes described above). A sync manager of the first authoring application obtained the updates from the master copy of the document 2010 by polling the device storing the master copy.

The user interface 2000 of the first authoring application displays an alert 2030 to the first user indicating the availability of the content update. In the example shown, a text box 2030 appears in the user interface 2000. In another embodiment, the second lock or text within the second lock can change color, pattern, or formatting. In another embodiment, an update counter increments when each new update is available.

Figure 31:
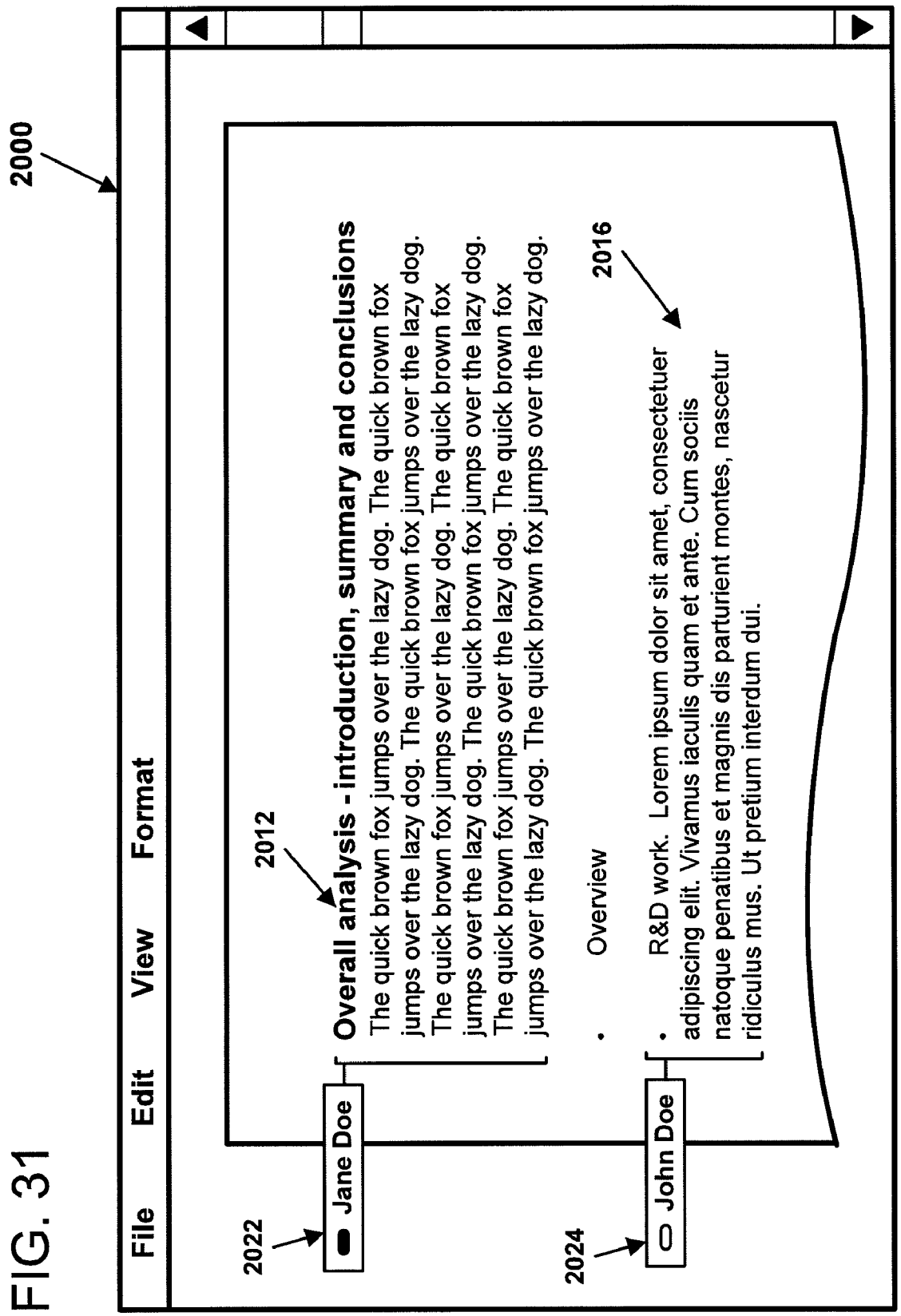

The first user can choose to view/instantiate the changes made by the second user or to ignore the content updates. The first user can continue to edit any unlocked data units within the document 2010 while ignoring the content updates. In one embodiment, the first user must instantiate the content updates before merging her updates with the master copy. In FIG. 31, the first user instructs the first authoring application to instantiate the content updates into the document 2010 displayed by the user interface 2000 of the first authoring application. Content changes made by the second user are now visible to the first user.

Embodiments of the disclosure may be implemented as a computer process (method), a computing system, or as an article of manufacture, such as a computer program product or computer readable media. The processes (programs) can be implemented in any number of ways, including the structures described in this document. One such way is by machine operations, of devices of the type described in this document. Another optional way is for one or more of the individual operations of the methods to be performed on a computing device in conjunction with one or more human operators performing some of the operations. These human operators need not be collocated with each other, but each can be only with a machine that performs a portion of the program.

The computer program product may be a computer storage media readable by a computer system and encoding a computer program of instructions for executing a computer process. The computer program product may also be a propagated signal on a carrier readable by a computing system and encoding a computer program of instructions for executing a computer process. The term computer readable media as used herein includes both storage media and communication media.

Those skilled in the art will appreciate that the disclosure may be practiced with other computer system configurations, including hand-held devices, multiprocessor systems, microprocessor-based or programmable consumer electronics, minicomputers, mainframe computers, and the like. The disclosure may also be practiced in distributed computing environments where tasks are performed by remote processing devices that are linked through a communications network. In a distributed computing environment, program modules may be located in both local and remote memory storage devices. Generally, program modules include routines, programs, components, data structures, and other types of structures that perform particular tasks or implement particular abstract data types.

We claim:

1. A method of facilitating collaborative editing of a document between a first user at a first computing device and at least one other user, the method comprising:
   accessing a user copy of the document at the first computing device including accessing content of the document and accessing metadata associated with the document, the content of the document being organized into units of data;
   receiving metadata updates periodically from a storage device, the metadata updates including any locks on units of data of the document that are associated with the other user;
   instantiating the received metadata updates automatically including storing the locks on the units of data of the document with the metadata associated with the document, wherein storing the locks with the metadata associated with the document prevents the first user from editing any units of data of the document that have locks associated with the other user;
   receiving content updates periodically from the storage device, the content updates including any modifications made to the content of the document by the other user;
   after receiving the content updates, determining whether instructions have been received from the first user to display the content updates to the first user;
   when it is determined that instructions have been received from the first user to display the content updates to the first user, displaying the content updates to the first user based on a first user selection included in the instructions, the first user selection determining whether the content updates are to be annotated on the user copy of the document or whether the content updates are to be merged into the user copy of the document;
   receiving at the first computing device an indication of editing of one of the units of data of the document by the first user;
   transmitting a content update to the storage device indicating modifications made to the unit of data edited by the first user;
   receiving instructions from the first user to transmit the content update to the storage device;
   instantiating any content updates received previously from the storage device into the user copy of the document;
   generating an upload copy of the document based on the user copy of the document including any instantiated content updates; and
   transmitting the upload copy of the document to the storage device.

2. The method of claim 1, wherein accessing the user copy of the document at the first computing device comprises:
   obtaining from the storage device a download copy of the document indicating a master state of the document;
   generating a base copy and the user copy of the document based on the download copy;
   downloading from the storage device the metadata associated with the document; and
   storing the metadata on the first computing device.

3. The method of claim 1, wherein receiving content updates periodically from the user computing device comprises retrieving a download copy of the document from the storage device, wherein the download copy indicates a master state of the document.

4. The method of claim 3, further comprising instantiating the received content updates only when instructed by the first user including merging the retrieved download copy of the document with the user copy of the document.

5. The method of claim 1, further comprising:
   updating the metadata stored on the first computing device to lock the unit of data being edited by the first user, wherein locking the unit of data associates the unit of data with the first user; and
   transmitting to the storage device automatically a metadata update based on the updated metadata stored on the first computing device.

6. The method of claim 5, further comprising:
   the content update to the storage device indicating modifications made to the unit of data edited by the first user being transmitted only when instructions to transmit the content update are received from the first user.

7. The method of claim 6, wherein receiving instructions from the first user to transmit the content update to the storage device comprises receiving instructions from the first user to store the document on the first computing device.

8. The method of claim 1, wherein receiving metadata updates periodically from the storage device comprises receiving presence information indicating identities of other users that are selected from a group consisting of users accessing the document and users associated with locks stored in the metadata associated with the document.

9. An authoring environment implemented on a first computing device to enable coauthoring of a document among users, the first computing device being configured to communicate with at least a storage device, the collaborative authoring environment comprising:
   a. cache configured to store a base copy of the document, a download copy of the document, an upload copy of the document, a working copy of the document, and a lock table;
   b. an authoring application configured to manipulate the working copy of the document including manipulating content of the working copy and manipulating metadata of the working copy;
   c. a layer object that provides an interface between the authoring application and the cache, the layer object being configured to update the lock table stored within the cache automatically with updated metadata when the authoring application manipulates the metadata of the working copy, the layer object also being configured to generate the upload copy of the document based on the working copy of the document when instructions to generate the upload copy are received from the authoring application, wherein the upload copy includes content updates obtained from the download copy of the document; and
   d. a sync manager configured to manage interactions between the cache and the storage device, the sync manager being configured to push the updated metadata from the lock table to the storage device automatically and being configured to push the upload copy of the document from the cache to the storage device when instructions to provide the updates to the content are received from the authoring application, the sync manager configured to obtain any updated download copy periodically from the storage device and to store the updated download copy within the cache of the first computing device, the updated download copy including content updates generated by other users,
   wherein, the authoring application is configured to receive instructions from a user of the authoring application to view any content updates contained in the updated download copy, the instructions including a user selection, the authoring application configured to display the content updates based on the user selection included in the instructions, the user selection determining whether the content updates are to be annotated on the working copy of the document or whether the content updates are to be merged into the working copy of the document, and wherein the authoring application provides alerts indicating an updated download copy is available for viewing at the first computing device.

10. The authoring environment of claim 9, wherein the authoring application includes a word processing application.

11. A computer readable storage medium storing computer executable instructions, which perform a method of authoring a document when executed by a computing device, the method comprising:
   receiving at a first authoring application instructions to manipulate a first unit of data of a document being edited by the first authoring application, the first authoring application being utilized by a first user and being implemented on a first computing device;
   generating a content lock on the first unit of data automatically after receiving the instructions to manipulate by associating the first unit of data with the first user in a lock table, the lock table being accessible to a plurality of other authoring applications, wherein only the first user can manipulate the first unit of data when the first unit of data has the content lock;
   manipulating the first unit of data of the document with the first authoring application in accordance with the instructions to manipulate;
   releasing the content lock on the first unit of data only when instructions to release the content lock are provided to the first authoring application by the first user, wherein releasing the content lock includes disassociating the first unit of data from the first user in the lock table;
   receiving at the first authoring application content updates, the content updates including any modifications made to the content of the document by a second user;
   after receiving the content updates, determining whether instructions have been received from the first user to display the content updates to the first user;
   when it is determined that instructions have been received from the first user to display the content updates to the first user, displaying the content updates based on a user selection included in the instructions, the user selection determining whether the content updates are to be annotated on the document or whether the content updates are to be merged into the document;
   expanding the content lock to encompass additional units of data when instructions from the first user to manipulate the additional units of data are received by the first authoring application, wherein expanding the content lock includes associating the additional units of data with the first user in the lock table; and
   transmitting automatically any lock updates to the lock table.

12. The computer readable storage medium of claim 11, wherein releasing the lock on the first unit of data comprises releasing the lock on the first unit of data when the first user provides to the first authoring application an indication that the first user has finalized edits to the first unit of data.

13. The computer readable storage medium of claim 11, wherein the lock table is stored on a remote storage device accessible by the other authoring applications.

14. The computer readable storage medium of claim 11, further comprising:
   retrieving updates to the lock table from the storage device, the updates to the lock table having been made by at least one of the other users;
   instantiating the updates to the lock table into the document automatically.

15. A computer readable storage medium storing computer executable instructions, which perform a method of authoring a document when executed by a computing device, the method comprising:
   receiving at a first authoring application instructions to manipulate a first unit of data of a document being edited by the first authoring application, the first authoring application being utilized by a first user and being implemented on a first computing device;
   manipulating the first unit of data of the document with the first authoring application in accordance with the instructions to manipulate;
   receiving at the first authoring application content updates, the content updates including any modifications made to the content of the document by a second user;
   after receiving the content updates, determining whether to display the content updates to the first user; and
   in response to determining whether to display the content updates to the first user, displaying the content updates based on a user selection, the user selection determining whether the content updates are to be annotated on the document or whether the content updates are to be merged into the document,
   wherein receiving content updates comprises retrieving a download copy of the document, wherein the download copy indicates a master state of the document.

16. The computer readable storage medium of claim 15, wherein the authoring application provides alerts indicating an updated download copy is available for viewing at the first computing device.

17. The computer readable storage medium of claim 15, further comprising instantiating the content updates only when instructed by the first user including merging the retrieved download copy of the document with the user copy of the document.

* * * * *